United States Patent
Wasserman

(10) Patent No.: US 7,324,682 B2
(45) Date of Patent: Jan. 29, 2008

(54) SYSTEM AND METHOD FOR EXCLUDING EXTRANEOUS FEATURES FROM INSPECTION OPERATIONS PERFORMED BY A MACHINE VISION INSPECTION SYSTEM

(75) Inventor: Richard M. Wasserman, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 557 days.

(21) Appl. No.: 10/808,948

(22) Filed: Mar. 25, 2004

(65) Prior Publication Data

US 2005/0213807 A1    Sep. 29, 2005

(51) Int. Cl.
  G06T 5/50     (2006.01)
  G06K 9/36     (2006.01)
(52) U.S. Cl. ................................. 382/145; 382/275
(58) Field of Classification Search ............... None
  See application file for complete search history.

(56) References Cited

U.S. PATENT DOCUMENTS

| | | | |
|---|---|---|---|
| 5,481,712 A | * | 1/1996 | Silver et al. ............... 717/109 |
| 5,859,698 A | * | 1/1999 | Chau et al. ............. 356/237.2 |
| 5,859,923 A | * | 1/1999 | Petry et al. ................. 382/141 |
| 6,542,180 B1 | | 4/2003 | Wasserman et al. |
| 6,627,863 B2 | | 9/2003 | Wasserman |
| 2002/0076096 A1 | | 6/2002 | Silber et al. |

OTHER PUBLICATIONS

Tim Lee et al., DULLRAZOR(R): A Software Approach to Hair Removal From Images, 1997, Elsevier Science LTD., Computers in Biology and Medicine, vol. 27, Issue 6, Nov. 1997, pp. 533-543.*
Brown, L.G., "A Survey of Image Registration Techniques" ACM Comp. Surv. 24(4):325-376, 1992.
Li, H., et al., "A Model-Based Approach for Automated Feature Extraction in Fundus Images," Proceedings of the Ninth IEEE International Conference on Computer Vision, Nice, France, Oct. 13-16, 2003, vol. 1, pp. 394 ff.
QVPAK 3D CNC Vision Measuring Machine Operation Guide, Version 2.0, Manual No. 4911GB, Series No. 359, Mitutoyo Corporation & Micro Encoder Inc., Kanagawa, Japan, Sep. 1996.

(Continued)

Primary Examiner—Brian Werner
Assistant Examiner—Thomas M Redding
(74) Attorney, Agent, or Firm—Christensen O'Connor Johnson Kindness PLLC

(57) ABSTRACT

Systems and methods are provided for excluding extraneous image features from inspection operations in a machine vision inspection system. The method identifies extraneous features that are close to image features to be inspected. No image modifications are performed on the "non-excluded" image features to be inspected. A video tool region of interest provided by a user interface of the vision system can encompass both the feature to be inspected and the extraneous features, making the video tool easy to use. The extraneous feature excluding operations are concentrated in the region of interest. The user interface for the video tool may operate similarly whether there are extraneous features in the region of interest, or not. The invention is of particular use when inspecting flat panel display screen masks having occluded features that are to be inspected.

21 Claims, 23 Drawing Sheets

OTHER PUBLICATIONS

*QVPAK 3D CNC Vision Measuring Machine User's Guide*, Version 7, 1st ed., Manual No. 99MCB225A, Series No. 359, Mitutuyo Corporation & Micro Encoder Inc., Kanagawa, Japan, Jan. 2003.

Sasada, R., et al., "Stationary Grid Pattern Removal Using 2-Dimensional Technique for Moiré-Free Radiographic Image Display," Galloway, Robert L., Jr. (ed.), *Visualization, Image-Guided Procedures, and Display, Proceedings of the SPIE—The International Society for Optical Engineering*, vol. 5029, San Diego, Calif., Feb. 16-18, 2003, pp. 688-697.

Shen, J., "Inpainting and the Fundamental Problem of Image Processing," *SIAM News* 36(5):1-4, Jun. 2003.

* cited by examiner

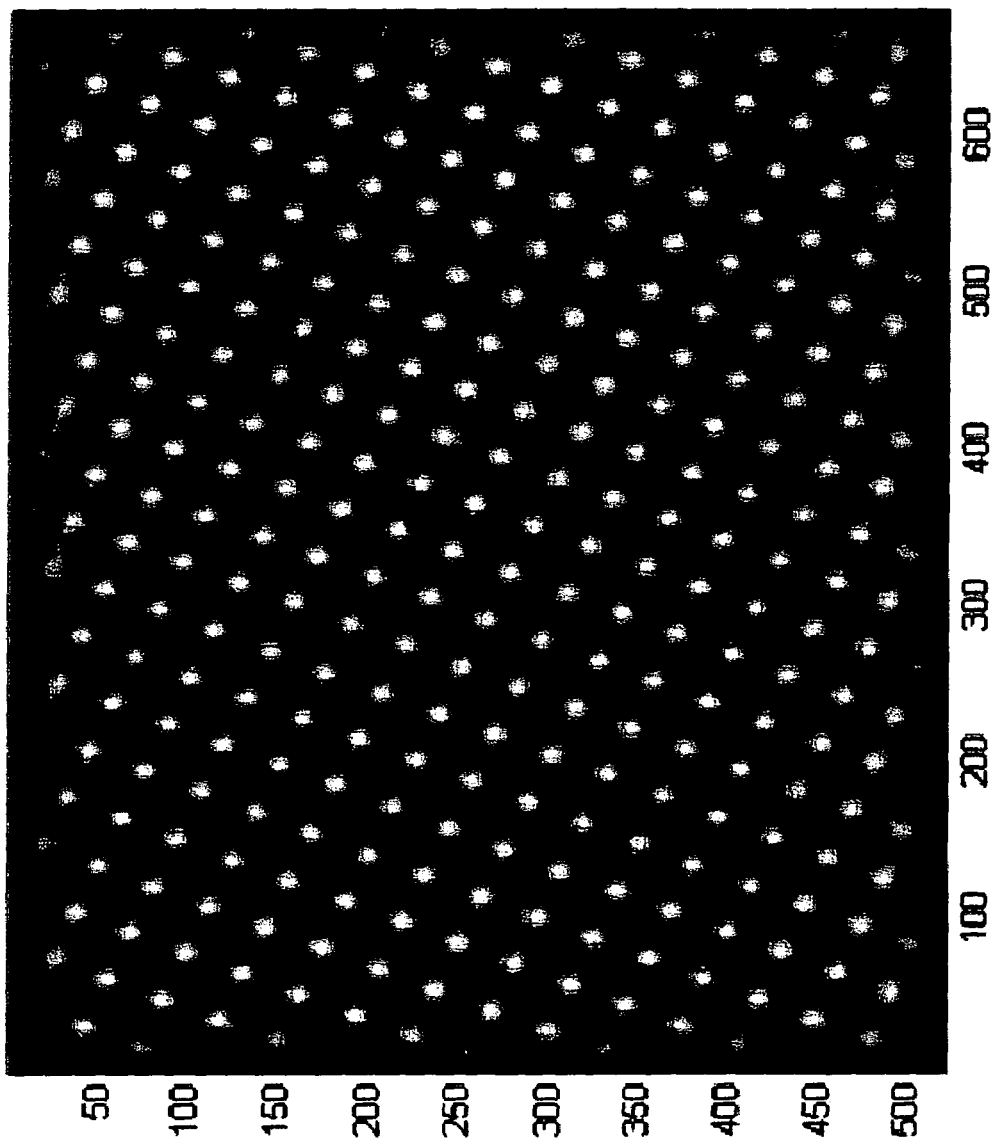

SYSTEM AND METHOD FOR EXCLUDING EXTRANEOUS FEATURES FROM INSPECTION OPERATIONS PERFORMED BY A MACHINE VISION INSPECTION SYSTEM

FIELD OF THE INVENTION

The invention relates generally to machine vision inspection systems, and more particularly to a system and method for excluding extraneous features from inspection operations.

BACKGROUND OF THE INVENTION

Precision machine vision inspection systems can be used to obtain precise dimensional measurements of inspected objects and to inspect various other object characteristics. Such systems may include a computer, a user interface, a lighting system, a camera and optical system, and a precision stage that is movable in multiple directions to allow an operator to position the camera to image various features of a workpiece. The user interface, among other things, generally includes various video tools that are positionable on an inspection image. In this way a user of the machine vision inspection system can position and operate the video tools to perform image processing operations that are useful for various control and inspection operations, while having little or no knowledge of image processing. One exemplary prior art system having such features, of a type that can be characterized as a general-purpose "off-line" precision vision system, is the commercially available QUICK VISION™ series of vision inspection machines and QVPAK™ software available from Mitutoyo America Corporation (MAC), located in Aurora, Ill. The features and operation of the QUICK VISION™ series of vision inspection machines, and the QVPAK™ software, including the user interface and various video tools are generally described, for example, in the QVPAK 3D CNC Vision Measuring Machine Users Guide, published January 2003 and the QVPAK 3D CNC Vision Measuring Machine Operation Guide, published September 1996, each of which is incorporated herein by reference in its entirety. This product, as exemplified, for example, by the QV-302 Pro model, uses a microscope-type optical system to provide images of a workpiece at various magnifications, and includes all of the features outlined above.

Such general-purpose "off-line" precision vision systems are characterized by their versatility, and they provide the ability for a user or an automatic program to rapidly change their configuration and imaging parameters in order to perform a wide variety of inspection tasks on various types of objects or inspection workpieces, or various aspects of a single workpiece.

General purpose precision machine vision inspection systems, such as the QUICK VISION™ system, are also generally programmable and operable to provide automated video inspection. It is generally desirable that such systems include features and tools that simplify the programming and operation of such systems, such that operation and programming can be performed reliably by "non-expert" operators.

Automated video inspection metrology instruments generally have a programming capability that allows an automatic inspection event sequence to be defined by the user for each particular workpiece configuration. The programming capability also typically provides the ability to store and/or output the results of the various inspection operations. Such programming can be implemented either in a deliberate manner, such as text-based programming, for example, or through a recording mode that progressively "learns" the inspection event sequence by storing a sequence of machine control instructions corresponding to a sequence of inspection operations performed by a user, or through a combination of both methods. Such a recording mode is often referred to as "learn mode" or "training mode."

In either technique, the machine control instructions are generally stored as a part program that is specific to the particular workpiece configuration. The ability to create part programs with instructions that automatically perform a predetermined sequence of inspection operations during a "run mode" of operation provides several benefits, including enhanced inspection repeatability, as well as the ability to automatically execute the same part program on a plurality of compatible machine vision inspection systems and/or at a plurality of times.

The exemplary QUICK VISION™ systems described above, as well as a number of other commercially available general purpose "off-line" vision systems, typically use conventional PC-based image acquisition accessories or components and conventional PC-based computer operating systems, such as the Windows® operating system, to provide their methods of operation, including their methods of operating during a sequence of auto focus operations.

In machine vision systems, "occlusion" type problems sometimes arise, that is, situations in which a foreground object interferes with the viewing or inspection of a background object. Occlusion problems have generally not been addressed by general purpose machine vision systems for inspection and measurement of workpieces. Previously, there have been no readily programmable alternatives. In general, the user had to carefully size and place tools using human judgment to avoid the occluding object and/or shadow. In such cases, when inspecting images having foreground and background features, such as edge features, in close proximity in the image, the slightest variation in construction between various workpieces, or lighting and shadows, will cause the carefully positioned and trained tools to fail or provide erroneous results.

Alternatively, various custom-designed image filtering processes have been designed by specialists to remove the unwanted image features. However, such filtering processes also filter the desired image feature, which alters its characteristics to some extent. In many cases this is undesirable, especially for various precision metrology operations used to inspect a workpiece.

As a further alternative, various custom-designed region or boundary "growing" and "connection" processes have been used to "reconstruct" a background object feature. However, such methods are time consuming to implement and require considerable knowledge. Furthermore, such methods are actually creating artificial features without actually increasing the "real" information available in the image. Therefore such methods introduce risk that a particular inspection operation may return results based primarily on the artificial features rather than the original image portions that are known to be real and valid. All of the previously described methods provide a poor basis for quality control and inspection operations, particularly in a general purpose machine vision inspection system intended to provide reliable operation and a relatively simple programming environment for relatively unskilled operators.

The present invention is directed to a system and method that overcomes the foregoing and other disadvantages. More specifically, the present invention is directed to a system and method for excluding extraneous features from inspection operations performed by a machine vision inspection system.

SUMMARY OF THE INVENTION

The present invention is directed to systems and methods for a machine vision metrology and inspection system for excluding extraneous image features from various inspection or control operations of the machine vision system.

One example of extraneous image features occurs when a grid, for example the screen mesh of a flat panel display screen mask, is seen as a foreground object in an image. In such cases, the grid may occlude a background object or pattern that is being inspected. When a foreground object such as a grid occludes a background object, frequently strong "edges" are created in the image. However, these edges are often not features which should be attributed to the background object. Possibly, they might be attributed to the foreground object. However, there is also a strong possibility that the edge of a shadow is introduced on the background object, as an artifact of the arrangement and lighting of the objects. Humans can quickly recognize this. However, it is not so easy for machines. Since a true background object feature and strong foreground object or shadow edges may be in close proximity in the image, it is difficult to automatically exclude the foreground object or shadow edge from the operations that are trying to measure true features of the background object.

One aspect of various embodiments of the invention is that no filtering or other image modifications are performed on the "non-excluded" original image data in the region of the feature to be inspected. Another aspect of various embodiments of the invention is that a region of interest associated with a video tool provided by the user interface of the machine vision system can encompass a region or regions of the feature to be inspected, as well as regions having excluded data, making the video tool easy to use and robust against reasonably expected variations in the spacing between the features to be inspected and the extraneous image features.

In various embodiments of the invention, the extraneous image excluding operations are concentrated in the region of interest defining operations of the machine vision system, such that the feature measuring or characterizing operations of the machine vision system operate similarly whether there is excluded data in the associated region of interest or not. Various user interface features and methods are provided for implementing and using the extraneous image feature excluding operations when the machine vision system is operated in a learning or training mode used to create part programs usable for repeated automatic workpiece inspection. The invention is of particular use when inspecting flat panel displays, or the patterned screen printing masks used in their manufacture, which often have occluded features to be inspected.

In accordance with another aspect of the invention, the system identifies extraneous image feature pixels by any one of various methods, and then in one embodiment excludes these pixels from the operations performed by various metrology and analysis tools.

In accordance with another aspect of the invention, a region of interest of a tool can be positioned without consideration of the extraneous image feature (i.e., because the extraneous image feature pixels will be excluded from analysis). That is, the region of interest can span the extraneous image feature and one or more valid edge portions, for example. This greatly simplifies the use of the tool for such applications.

In accordance with another aspect of the invention, the system performs no information altering morphological operations on the portions of the image that contain the valid image data outside the extraneous image feature. This preserves the original workpiece information in its most complete form. In one embodiment, the extraneous image feature locating operations do not simultaneously alter the "non-extraneous image feature" information. In one embodiment, total exclusion of a pixel or pixels is preferable to modification and inclusion.

In accordance with another aspect of the invention, the system performs the extraneous image feature exclusion in a way that allows standard, or near-standard, versions of the various image metrology tools to function for images that include extraneous image features. This results in avoiding "tool proliferation" and the need for related operator training, thus making the overall system easier to use and maintain.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
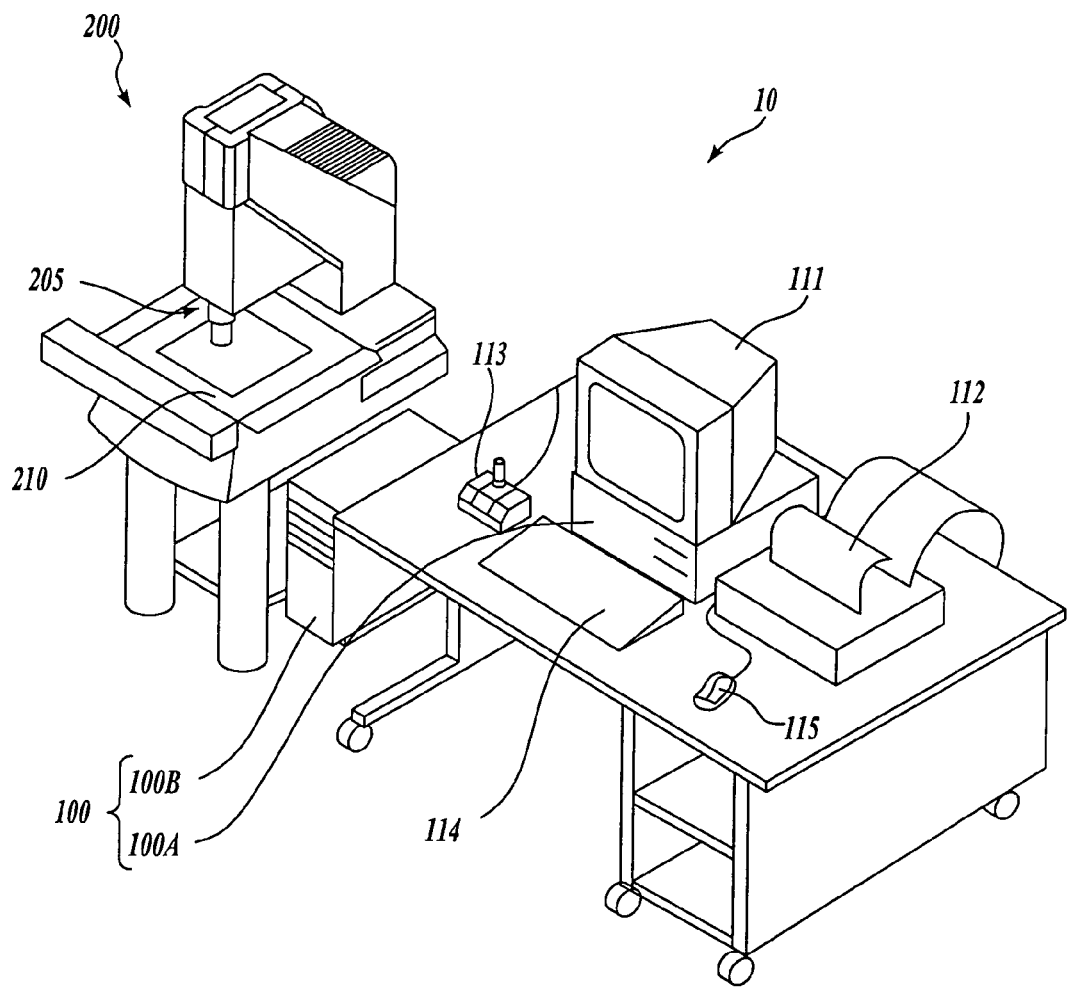
FIG. 1 is a diagram of one exemplary general purpose machine vision and inspection system.

FIG. 1 is a block diagram of one exemplary embodiment of a general purpose programmable machine vision inspection system 10 in accordance with this invention. The machine vision inspection system 10 includes a vision measuring machine 200 that is operably connected to exchange data and control signals with a control system 100. The control system 100 is further operably connected to exchange data and control signals with one or more of a monitor 111, a printer 112, a joystick 113, a keyboard 114, and/or a mouse 115. The vision measuring machine 200 includes a moveable workpiece stage 210 and an optical imaging system 205 which may include a zoom lens or a number of interchangeable lenses. The zoom lens or interchangeable lenses generally provide various magnifications for the images provided by the optical imaging system 205.

The joystick 113 can typically be used to control the movement of the movable workpiece stage 210 in both the X and Y directions, which are generally parallel to the focal planes of the optical imaging system 205, and the movement direction component of the movable optical imaging system 205 in the Z or focus direction. Frequently, the deflection that controls the Z axis is a rotary deflection component of a handle or knob of the joystick 113. The joystick 113 may be provided in a form other than that shown, such as any visual representation or widget on the monitor 111 which is intended to function as a "virtual motion control device" of the machine vision inspection system 10 and is controllable through any computer input device, such as the mouse 115 or the like.

Figure 2:
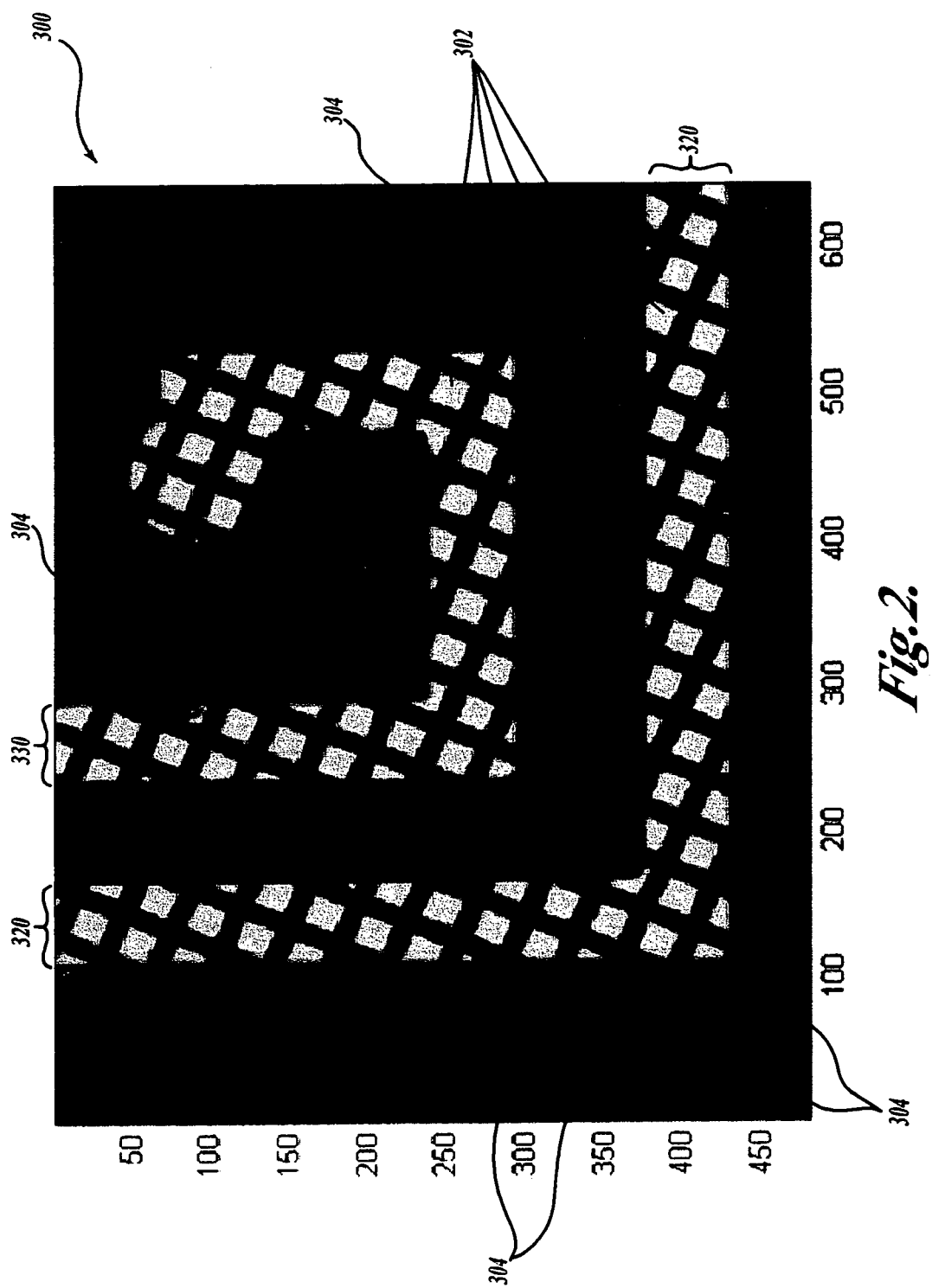
FIG. 2 is a diagram of an exemplary workpiece and feature to be inspected including an overlay grid of a flat panel display screen mask.

FIG. 2 is a diagram of a portion of a display area 300 of a general purpose machine vision inspection system showing an exemplary workpiece and feature to be inspected including an overlay grid of a flat panel display screen mask. As shown in FIG. 2, the display area 300 is in a standard 640×480 camera pixel format, and is overlain by a repetitive grid pattern 304 of the flat panel display screen mask. In one embodiment, the nominal size, layout, and general orientation of the grid 304 are known prior to inspection, although as will be described in more detail below, such information is not necessary for the inspection process. Also beneath the grid 304 is a background layer 302 which may comprise a substrate, a patterned film, or other surface, and generally includes image information that is not the focus of the measurement process. The objects to be inspected on the workpiece include the traces 320 and 330, which will be described in more detail below. As will also be described in more detail below, the grid pattern 304 complicates the inspection process in that the grid itself inherently has strong interlaced edge features which complicate the determination and evaluation of the edge portions of the traces 320 and 330.

Figure 3:
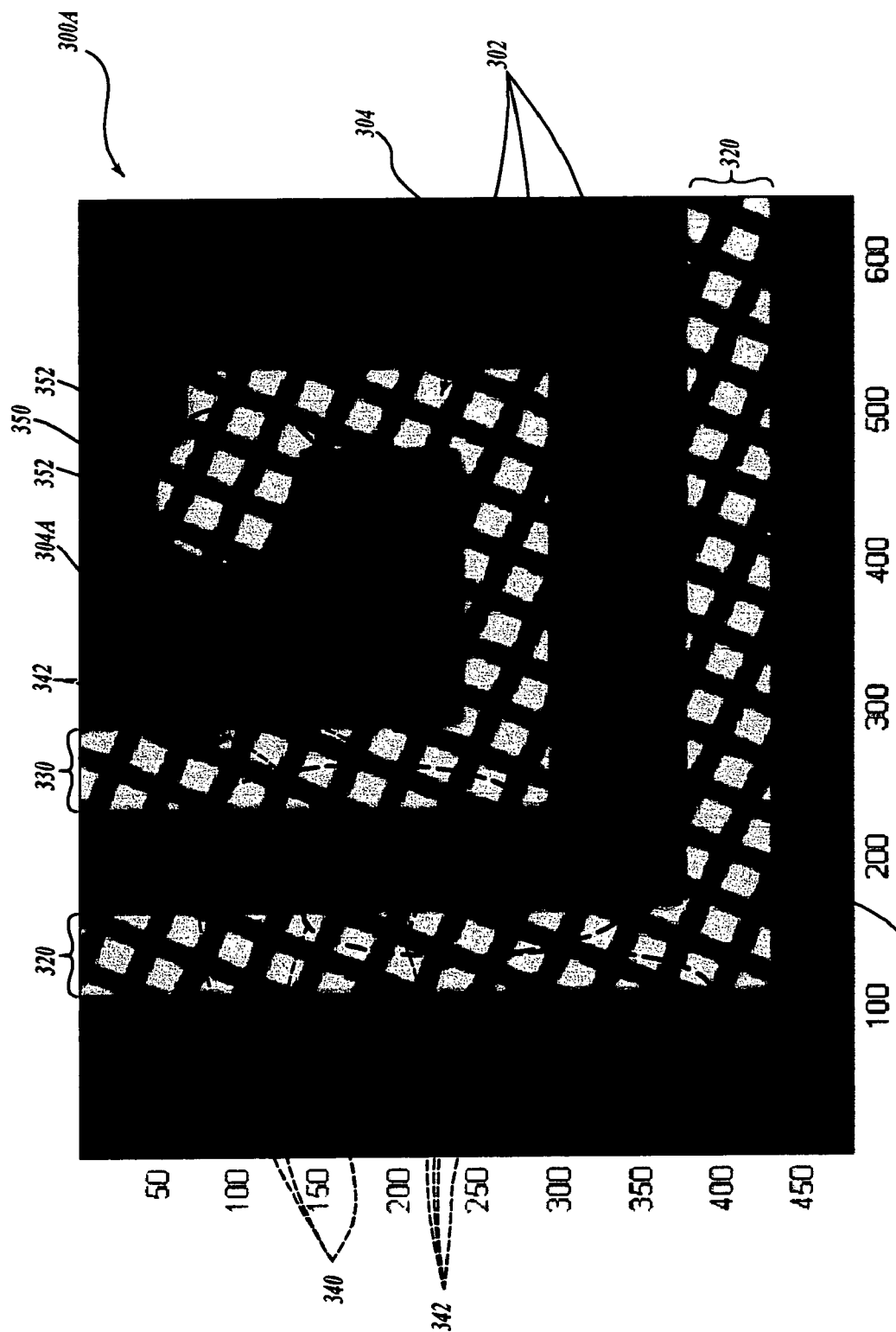
FIG. 3 is a diagram of the exemplary workpiece and feature of FIG. 2 illustrating selected edge portions of the feature.

FIG. 3 is a diagram of a display area 300A showing the exemplary workpiece and feature of FIG. 2 illustrating selected edge portions of the feature. As shown in FIG. 3, the display area 300A has been artificially lightened for purposes of illustration in order to better emphasize the traces 320 and 330. The background layer 302 is visible through open sections of the grid 304. It will be appreciated that while a grid type object 304 is discussed herein, the methods of the present invention may be applied to any type of extraneous foreground or background object. A grid portion 304A is shown to be located over a section of the background layer 302, while another grid portion 304B is shown to be located over a section of the trace 320. A series of large ovals 340 are shown to generally surround edge portions of the traces 320 and 330. The large ovals 340 include smaller circles 342 which emphasize relevant portions of the edge sections of the traces 320 and 330. A circle 350 is also shown to be surrounding a circular end of the trace 330. The circle 350 includes smaller circles 352 which surround and emphasize relevant edge portions of the trace 330 which can be utilized for operations such as determining the edges (e.g., as part of the determination of the radius of an arc or the diameter of the circular end portion of the trace 330).

The image information in the two large ovals 340 on either side of the trace 320 can be utilized, in one embodiment, for operations such as determining the spacing (i.e., width) between the edges of the trace 320. The smaller circles 342 show exemplary regions of valid data for performing this process. It will be understood that while the smaller circles show valid data regions that may be utilized, other valid data regions may also exist within the large ovals 340. As will be discussed in more detail below, it is often not desirable to attempt to reconstruct the non-visible portions of the traces, instead it is preferred to obtain precise measurements from the data that is available. In other words, for the measuring operations, it is not desirable to attempt to reconstruct a visual representation of the complete object, as the extrapolation of any missing portions may in some cases include certain inaccuracies regarding the edges of the object.

As will be described in more detail below, similar to the ovals 340 and circle 350, according to this invention video tools may be utilized which encompass a region or regions of the feature to be inspected, as well as regions having excluded data, thus making the video tool easy to use and robust against reasonably expected variations in the spacing between the features to be inspected and the extraneous image features. As will also be discussed in more detail below, the extraneous image excluding operations may be concentrated in the region of interest defining operations of the machine vision system, such that the feature measuring or characterizing operations of the machine vision system operate similarly regardless of whether there is excluded data in the associated region of interest or not.

Figure 4:
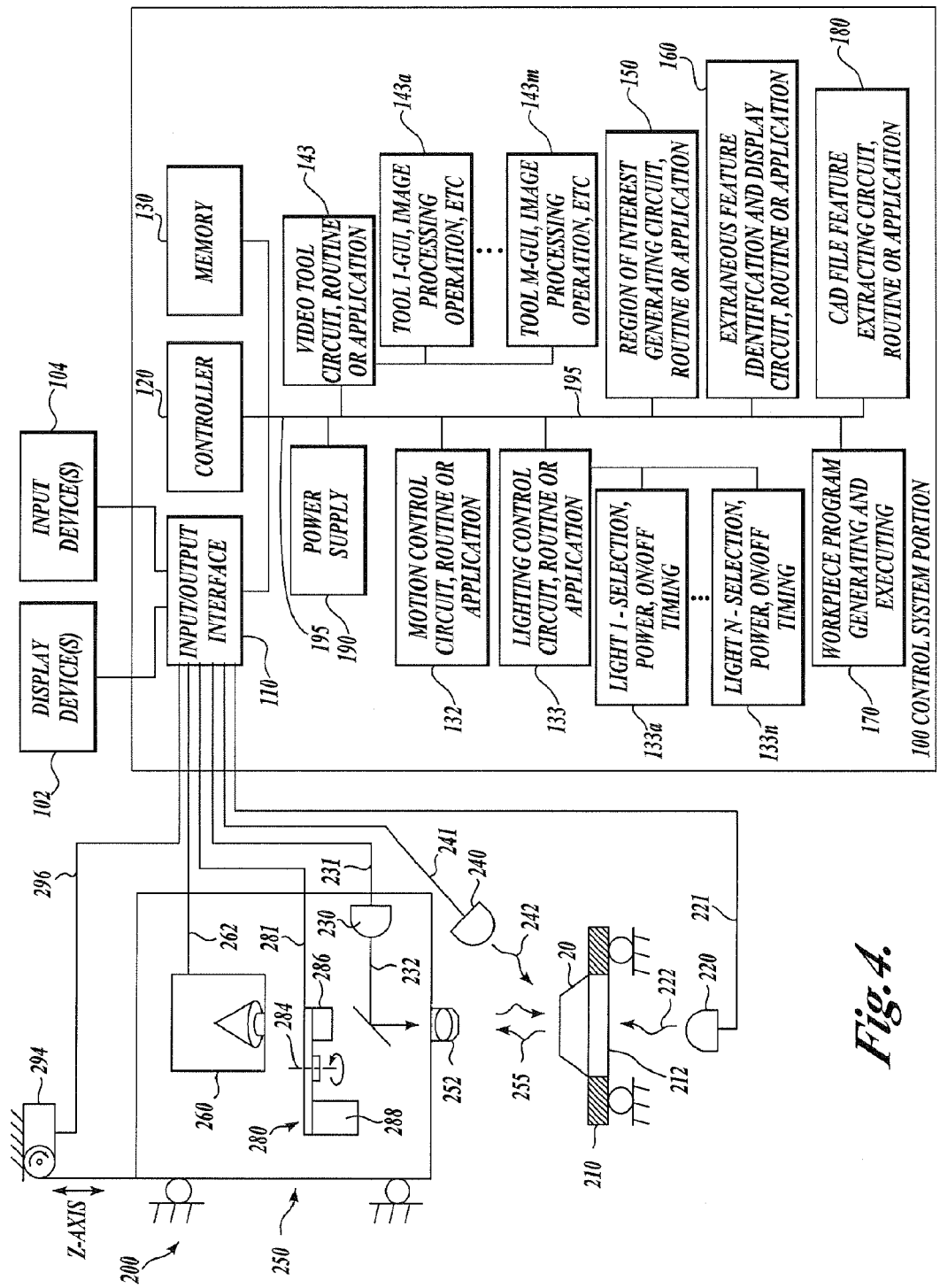
FIG. 4 is a block diagram showing in greater detail one exemplary embodiment of the control system portion and the vision component portion of the machine vision inspection system of FIG. 1.

FIG. 4 is a block diagram showing in greater detail one exemplary embodiment of the vision components portion 200 and the control system portion 100 of the machine vision inspection system 10 of FIG. 1. As shown in FIG. 4, the control system portion 100 controls the vision components portion 200. The vision components portion 200 includes an optical assembly portion 250, light sources 220, 230 and 240, and the workpiece stage 210 having a central transparent portion 212. The workpiece stage 210 is controllably movable along X and Y axes that lie in a plane that is generally parallel to the surface of the stage where a workpiece 20 may be positioned. The optical assembly portion 250 includes a camera system 260, an interchangeable objective lens 252, a turret lens assembly 280, and the coaxial light source 230. The optical assembly portion 250 is controllably movable along a Z axis that is generally orthogonal to the X and Y axes by using a controllable motor 294.

The workpiece 20 to be imaged using the machine vision inspection system 10 is placed on the workpiece stage 210. One or more of the light sources 220, 230 or 240 emits source light 222, 232, or 242, respectively, that is usable to illuminate the workpiece 20. Light emitted by the light sources 220, 230 and/or 240 illuminates the workpiece 20 and is reflected or transmitted as workpiece light 255, which passes through the interchangeable objective lens 252 and one of a lens 286 or a lens 288 of the turret lens assembly 280 and is gathered by the camera system 260. The image of the workpiece 20, captured by the camera system 260, is output on a signal line 262 to the control system portion 100.

The light sources 220, 230, and 240 that are used to illuminate the workpiece 20 can include the stage light 220, the coaxial light 230, and the surface light 240, such as a ring light or a programmable ring light, connected to the control system portion 100 through signal lines or busses 221, 231 and 241, respectively. As a primary optical assembly of the machine vision inspection system 10, the optical assembly portion 250 may include, in addition to the previously discussed components, other lenses, and other optical elements such as apertures, beamsplitters and the like, such as may be needed for providing coaxial illumination, or other desirable machine vision inspection system features. The control system portion 100 rotates the turret lens assembly 280 along axis 284, between at least the first and second turret lens positions, in response to control signals transmitted over a signal line or bus 281.

The distance between the workpiece stage 210 and the optical assembly portion 250 can be adjusted to change the focus of the image of the workpiece 20 captured by the camera system 260. In particular, in various exemplary embodiments of the machine vision inspection system 10, the optical assembly portion 250 is movable in the vertical Z axis direction relative to the workpiece stage 210 using the controllable motor 294 that drives an actuator, a connecting cable, or the like, to move the optical assembly portion 250 along the Z axis. The term Z axis, as used herein, refers to the axis that is intended to be used for focusing the image obtained by the optical assembly portion 250. The controllable motor 294, when used, is connected to the control system portion 100 via a signal line 296.

As shown in FIG. 4, in various exemplary embodiments, the control system portion 100 includes: an input/output interface 110; a controller 120; a memory 130; a motion control circuit, routine, or application 132; a lighting control circuit, routine, or application 133; a video tool circuit, routine, or application 143; a region of interest generating circuit, routine, or application 150; an extraneous feature identification and display circuit, routine, or application 160; a workpiece program generating and executing circuit, routine, or application 170; a CAD file feature extracting circuit, routine, or application 180; and a power supply portion 190. It should be appreciated that such components may encompass hard wired circuits, software circuits, subroutines, objects, operations, application programming interfaces, managers, applications, or any other known or later-developed hardware or software structure. It will further be appreciated that each of the elements of the control system 100, as well as the additional elements described below, may be interconnected by one or more data and/or control busses and/or application programming interfaces 195.

The control system portion 100 is usable to determine image acquisition settings or parameters and/or acquire an image of the workpiece 20 such that the input image of the workpiece 20 has desired image characteristics in a region of interest that includes a workpiece feature to be inspected. In various exemplary embodiments, when a user uses the machine vision inspection system 10 to create a workpiece image acquisition program for the workpiece 20 according to this invention, the user generates workpiece program instructions either by explicitly coding the instructions automatically, semi-automatically, or manually, using a workpiece programming language, or by generating the instructions by moving the machine vision inspection system 100 through an image acquisition training sequence such that the workpiece program instructions capture the training sequence. In particular, these instructions will cause the machine vision inspection system to manipulate the workpiece stage 210 and/or the camera system 260 such that a particular portion of the workpiece 20 is within the field of view of the camera system 260 and will provide a desired magnification, a desired focus state and a desired illumination. This process may be repeated for multiple images in a set of images that are to be captured for inspecting a workpiece.

In various exemplary embodiments, for each desired image, the control system portion 100 will then command the camera system 260 to capture that image of the workpiece 20 and output that captured image to the control system portion 100. In particular, the captured image is input from the camera system 260, through the input/output interface 110 and stored in the memory 130 under control of the controller 120. The controller 120 may also cause the captured image to be displayed on one of the display devices 102.

The control system portion 100 is further usable to inspect workpiece features in such workpiece inspection images, and to store and/or output the inspection results. In various exemplary embodiments, when a user uses the machine vision inspection system 10 to create at least a portion of a workpiece image inspection program for the workpiece 20 according to this invention, the user generates workpiece program instructions either by explicitly coding the instructions automatically, semi-automatically, or manually, using a workpiece programming language, or by generating the instructions by moving and/or controlling the machine vision inspection system 10 through an image inspection training sequence such that the workpiece program instructions capture the training sequence.

In particular, these instructions will cause the machine vision inspection system 10 to perform various inspection operations on the image. Various known machine vision system "tools", which will be described in more detail below, may be stored in the video tool component 143 and can be used in performing the various foregoing operations.

A few examples of video tools usable for various inspection operation are disclosed in U.S. patent application Ser. Nos. 09/736,187, 09/921,886, and U.S. Pat. No. 6,542,180, each of which is incorporated herein by reference in its entirety. This process may be repeated for multiple images in a set of images used to inspect a workpiece 20.

One or more display devices 102 (e.g., the monitor 111 and the printer 112 of FIG. 1), and one or more input devices 104 (e.g., the devices 113-115 of FIG. 1), can be connected to the input/output interface 110. The display devices 102 and input devices 104 can be used to view, create and/or modify part programs, to view the images captured by the camera system 260 and/or to directly control the vision system components portion 200. In a fully automated system having a predefined workpiece program, the display devices 102 and/or one or more of the input devices 104 may be omitted.

The signal lines or busses 221, 231, and 241 of the stage light 220, the coaxial light 230, and the surface light 240, respectively, may also all be connected to the input/output interface 110. A control signal line or bus 281 of the turret lens assembly 280 is also connected to the input/output interface 110. The signal line 262 from the camera system 260 and the signal line 296 from the controllable motor 294 are also connected to the input/output interface 110. In addition to carrying image data, the signal line 262 may carry a signal from the controller 120 that initiates image acquisition.

The lighting control circuit, routine, or application 133 includes light control elements 133A-133N, which control, for example, the selection, power, and on/off timing, for the various corresponding light sources of the machine vision inspection system, such as the light sources 220, 230, and 240. The motion control circuit, routine, or application 132 may include position control elements and/or speed/acceleration control elements. In various exemplary embodiments, such elements may be merged and/or indistinguishable.

In various exemplary embodiments, the memory portion 130 may contain data defining a graphical user interface operable through the input/output interface 110. Such an embodiment is exemplified by the previously discussed QUICK VISION™ series of vision inspection machines and the QVPAK™ software, for example. The memory portion 130 may also store data and/or "tools" usable to operate the vision system components portion 200 to capture or acquire an image of the workpiece 20 such that the acquired image of the workpiece 20 has desired image characteristics. The memory portion 130 may include video tool circuit, routine, or application 143 for this purpose, which includes data and/or video tools 143A-143M, usable to operate the machine vision inspection system 100 to perform various inspection and measurement operations on the acquired images, either manually or automatically, and to output the results through the input/output interface 110. In one embodiment, the tools 143A-143M may determine the GUI image processing operation, etc., for each of the corresponding tools. The region of interest generating circuit, routine, or application 150 may support automatic, semi-automatic, and/or manual operations that define various regions of interest that are operable in various video tools included in the video tool portion 143.

Various known image processing and/or feature analysis or inspection tools 143 may be used for assistance in performing the various inspection operations. Such tools may include, for example, shape or pattern matching tools, edge and/or boundary detection tools, circle and dimension measuring tools, and the like. Examples of the use of such video tools in a precision machine vision inspection system according to this invention are described in greater detail below with reference to FIG. 10.

In one embodiment, the video tool circuit, routine, or application 143 can call the region of interest generating circuit, routine, or application 150, although it will be understood that the region of interest generating circuit, routine, or application 150 may operate independently of the video tool circuit, routine, or application 143. In one embodiment, the region of interest generating circuit, routine, or application 150 defines the region of interest to be a subset of the area within the tools that are drawn, which in one embodiment may comprise internal areas within the video tool (e.g., internal boxes or circles).

As previously indicated, in various exemplary embodiments according to this invention, the region of interest generating circuit, routine, or application 150 includes or calls the operations that are responsible for picking out the valid data which is then passed to the video tool imaging processing algorithms. The various algorithms which perform the sets of operations associated with various video tools can then operate in the usual manner. In other words, the operations and imaging processing algorithms of many current video tools are already structured to be able to insure or confirm certain aspects of operation that are critical for providing a valid measurement result or control instruction from the algorithms that they use, such as whether there are enough adjacent pixels along a scan line, or enough contrast, etc. Thus, in various exemplary embodiments where the region of interest generating circuit, routine, or application 150 defines the valid data that a video tool receives or operates on, the video tool can operate according to the same operations used for "unscreened" image data, and it will either produce a valid measurement, or fail and/or set an error flag, as usual. Of course, in addition, the video tool will not be confused in its operations by any edges or other image characteristics that are part of the extraneous data because that data is excluded from the addresses or data that are passed to the video tool by the region of interest generating circuit, routine, or application 150.

In summary, in various embodiments, the region of interest generating circuit, routine, or application 150 not only determines the pixels of interest, but also eliminates some of the pixels as being not-of-interest based on criteria that define the extraneous or not-of-interest pixels, according to the above considerations. Furthermore, in one embodiment, the extraneous pixels (e.g., the pixels of the repetitive grid pattern 304) are identified by the extraneous feature identification and display circuit, routine, or application 160. The operations of the region of interest generating circuit, routine, or application 150, the extraneous feature identification and display circuit, routine, or application 160, as well as the video tool circuit, routine, or application 143, will be described in more detail below.

The extraneous feature identification and display circuit, routine, or application 160 is usable to create and/or apply various extraneous feature identification, exclusion and display operations to an image of a workpiece having an extraneous feature to be excluded from various image processing operations. In various exemplary embodiments, an operator selects or creates one or more parameters or part program instructions to determine extraneous feature identification operations and/or parameters usable in the extraneous feature identification and display circuit, routine, or application 160. In various other exemplary embodiments, one or more previously determined extraneous feature identification operations are provided to the operator, who selects one or more of the previously determined extraneous feature identification operations to be applied. In either case, in various exemplary embodiments according to this invention, extraneous feature identification operations are applied to a captured image by the extraneous feature identification and display circuit, routine, or application 160. The extraneous feature identification and display circuit, routine, or application 160 then, under control of the controller 120, either provides the results of its operations to the memory 130 and/or outputs the results directly to one or more image processing or analysis operations to be applied to desired inspection features in the captured image, such as image processing or analysis operations provided by the video tool circuit, routine, or application 143.

In various exemplary embodiments according to this invention where one or more sets of previously determined extraneous feature identification operations are provided to the operator, any one of such sets of previously determined extraneous feature identification operations may be selected by a user based on its efficacy for a particular workpiece. Furthermore, the selected set of extraneous feature identification operations may be governed by one or more selectable parameters such that the selected set of extraneous feature identification operations can be customized to provide the most reliable operation and accurate results for a particular class of workpieces. Such selectable extraneous feature identification operations and parameters allow relatively unskilled operators to vary the operation of the extraneous feature identification operations to create workpiece-specific part programs that operate robustly, without requiring the operator to learn or understand relatively complex image processing operations. In various exemplary embodiments, the selectable sets of extraneous feature identification operations may be selected semi-automatically, or manually during a training mode of operation or during any alternative type of part programming. In various other exemplary embodiments, a default set of extraneous feature analysis and/or identification operations and parameters may be used. Once one or more appropriate values for the analysis parameters are determined, the workpiece program generating and executing circuit, routine or application 170 is activated to generate a part program instruction for the determined values for the transform analysis parameters.

The workpiece program generating and executing circuit, routine or application 170 is usable to create a part program based on operator input and/or operator manipulation of the vision measuring machine 200 of the machine vision inspection system 10. The workpiece program generating and executing circuit, routine or application 170 can be used either to create a part program using a part program language and/or can be used to capture manipulations of the vision measuring machine 200 and generate part program instructions based on these manipulations of the vision measuring machine 200 when the machine vision inspection system 10 is placed in a training mode.

The CAD file feature extracting circuit, routine or application 180, if implemented, is usable to analyze workpiece definition files, such as CAD files and the like, to extract geometric information regarding line-type features, planes, etc., including the nominal shape and/or placement of an extraneous feature to be excluded from various image processing operations from the workpiece definition file. These extracted features can subsequently be used to determine and/or define positions, dimensions, and constraints for aiding in programming and/or inspecting the workpiece. These constraints include, for example, the spacing between a pair of lines, an angle of intersection between a pair of lines, a spacing between a line and some other feature of the workpiece and/or an angle between a line and some other feature of the workpiece.

The CAD file feature extracting circuit, routine, or application 180, operates on information such as a CAD file representing a workpiece, or a previous image of a substantially identical workpiece, which are frequently available in industrial applications of machine vision inspection systems. In the case of a CAD file representation, it should be appreciated that the locations of edges and boundaries in the CAD file representation may be determined manually, in a semi-automated fashion, or fully automatically from a CAD representation, by a variety of known CAD file feature extraction methods. In this case, the spatial locations of the corresponding edges and boundaries in a current set of inspection images of a corresponding workpiece may then be determined by a further variety of known manual, semi-automated, or automated spatial congruence and/or feature congruence image processing methods. These methods may include, for example, coordinate matching, pattern matching, template matching, and the like. For example, such methods are routinely used to inspect the positions of edges and boundaries on workpieces in a variety of commercially available machine vision inspection systems, such as the QUICK VISION™ series of vision inspection machines and QVPAK™ software discussed above. It should be appreciated that the CAD file feature extracting circuit, routine, or application 180 is optional, and thus can be omitted in various exemplary embodiments according to this invention, and particularly in those embodiments that do not determine or use line-related constraints that are based on geometric information, or if an electronic version of the workpiece surface to be inspected does not exist and/or will not be used to identify or isolate lines in the workpiece image.

Figure 5:
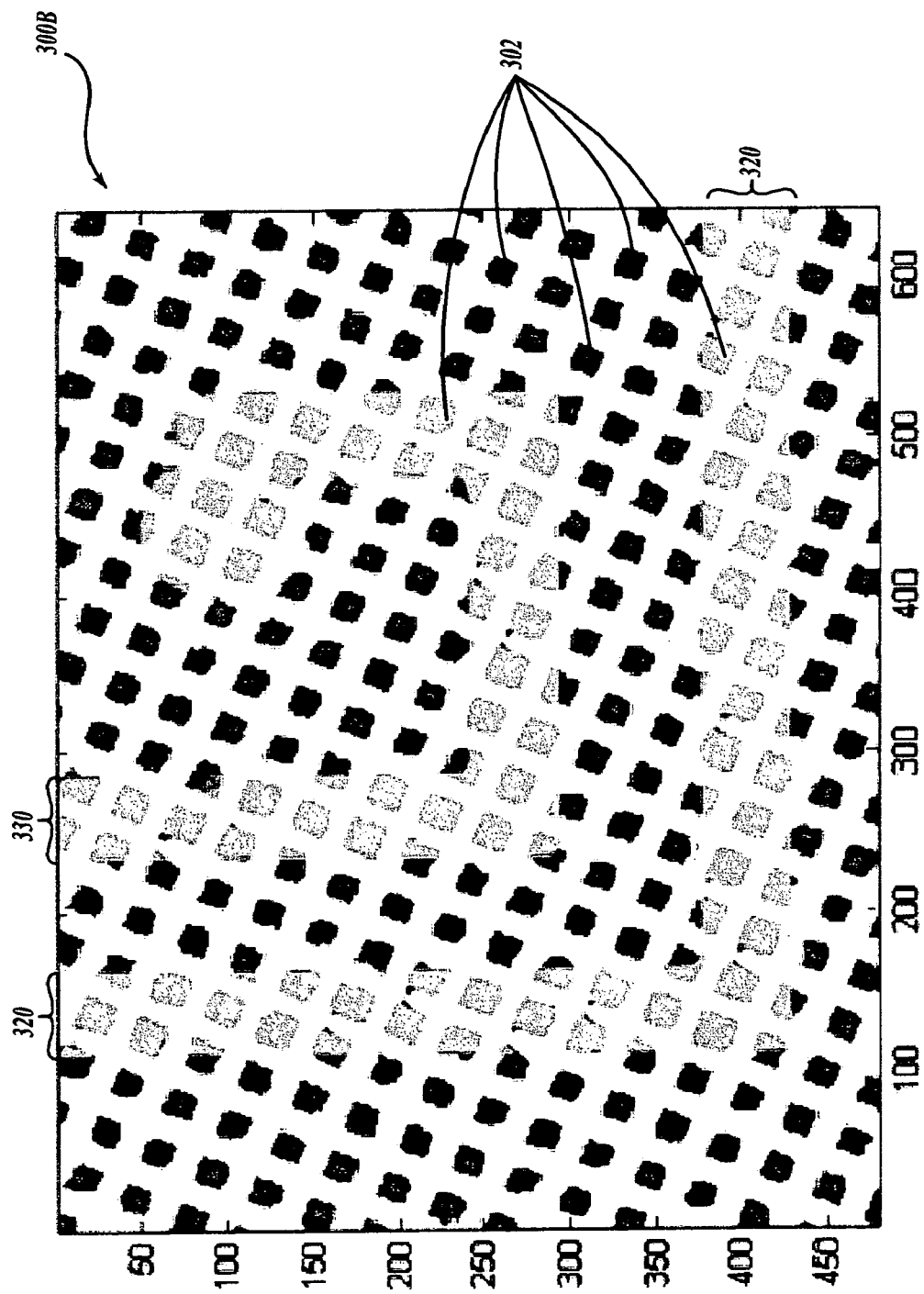
FIG. 5 is a diagram of the exemplary workpiece and feature of FIG. 2 wherein extraneous data has been removed.

FIG. 5 is a diagram of a portion of a display area 300B including the exemplary workpiece and feature of FIG. 2 wherein extraneous data (e.g., the repetitive grid pattern 304) have been removed. As shown in FIG. 5, the background layer 302 and the traces 320 and 330 are no longer overlain by the repetitive grid pattern 304. As will be discussed in more detail below, in accordance with the present invention, when performing an operation for removing the extraneous data such as has been performed in the display area 300B, it is desirable to not only remove the extraneous structure but also any shadows present in the image due to the extraneous structure. Thus, such shadows comprise part of the extraneous feature and extraneous data that is removed in various embodiments and/or applications herein.

In FIG. 5, the white areas are the areas that have been identified as extraneous data (e.g., the repetitive grid pattern 304) and removed. There are many cases where it is desirable to not only remove the physical bounds of the foreground structure (i.e., the extraneous structure), but also any shadows. In other words, when such features are in the foreground, the lighting may create a shadow around the features, and those shadows may provide fairly strong edges depending on the type of lights that are used on the machine vision system and depending on the structure of the workpiece. It should be noted that if CAD data has previously indicated a predicted location of an extraneous image feature, that depending on how the user is placing the lighting system, the shadows may in effect alter the location of the extraneous image feature in the image such that it will not appear where the CAD data predicts it should have been. As will be discussed in more detail below, it is thus desirable to utilize methods of removing the extraneous data (e.g., the repetitive grid pattern 304) which also address any issues arising from shadows. In certain other cases, shadows may not be so much of an issue, in which case simpler methods (e.g., purely analytic methods) may be used. In other words, if the extraneous image feature is particularly well behaved in the image and does not have lighting complications (e.g., shadows) or other issues, CAD data that is model-based on how the extraneous image feature is supposed to appear may be utilized as the primary part of the analytical method for removing the extraneous image feature from the image. In other words, if the extraneous data is particularly deterministic, then it can sometimes be removed by purely analytical methods. Such analytic methods may only require rotating or otherwise maneuvering the extraneous image feature pattern to its proper orientation in order to remove the extraneous data.

As noted above, there are a number of approaches that may be taken to the problem of identifying and removing extraneous image data, such as the grid pattern 304, from the data of the display area 300B prior to performing edge detection.

FIG. 6 shows intermediate images or pseudo-images that illustrate one embodiment of a first generic type of method that is usable for identifying and removing certain types of extraneous feature data in various embodiments and/or applications according to this invention, as demonstrated on the flat panel display screen mask image shown in FIG. 2. Briefly, the first generic type of method includes using thresholding techniques to identify regions corresponding to extraneous pixels in an image, and morphology techniques to filter and/or smooth anomalous portions of the boundaries of the regions.

The embodiment of the method used for the results shown in FIG. 6 does not require a priori knowledge of the characteristics of an extraneous feature of the workpiece. It is particularly effective when the extraneous data in the image has a relatively uniform and/or extreme (high or low) intensity value. For example, this may often be the case when a workpiece is of a type that can be illuminated using a stage light, or the like, to backlight various valid and/or extraneous features, and thereby show them with a strong intensity contrast in an image.

Figure 6A:
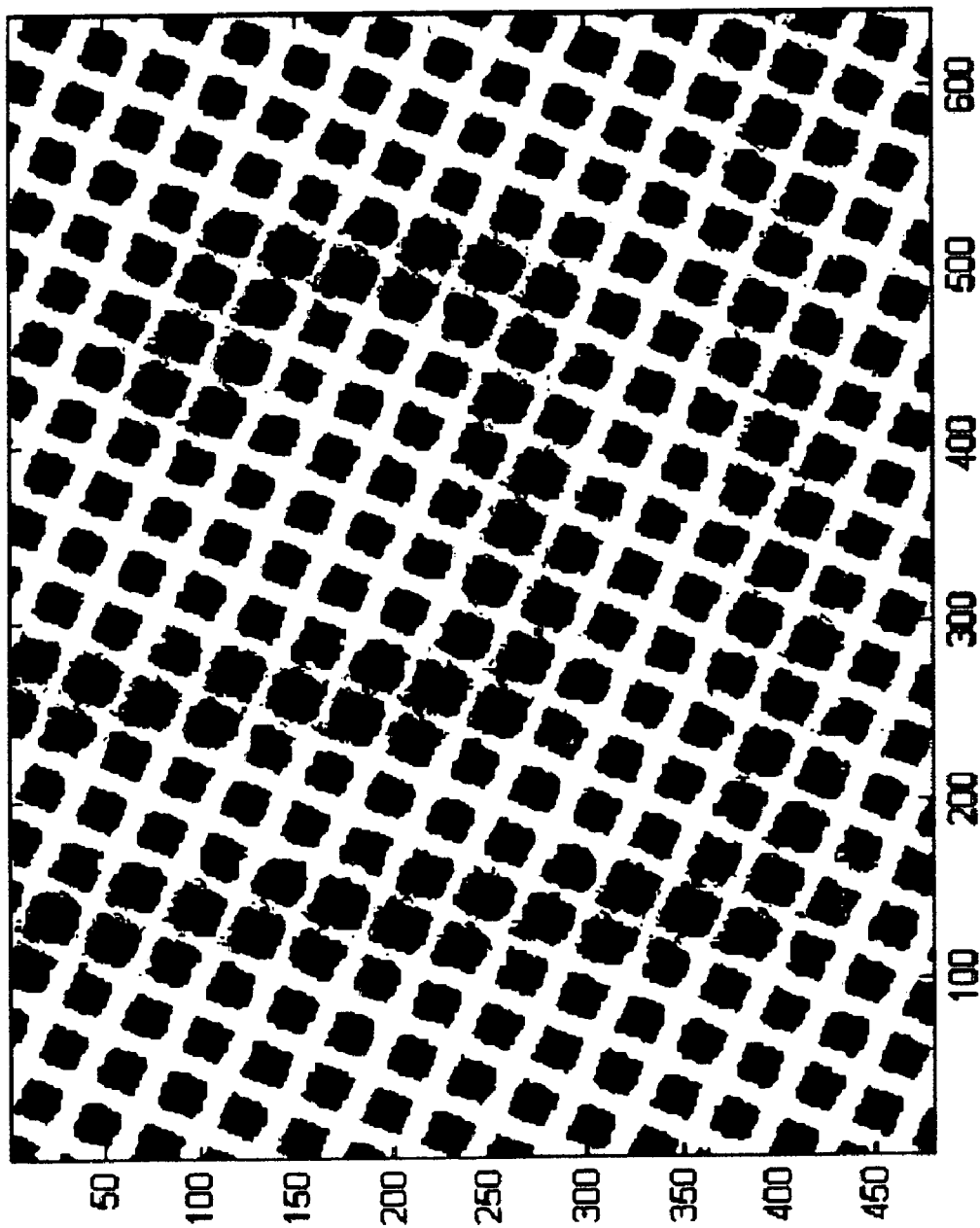
FIG. 6 shows intermediate pseudo-images that illustrate one embodiment of a first generic type of method that is usable for identifying pixels corresponding to certain types of extraneous features.

The pseudo-image of FIG. 6A is determined from the image shown in FIG. 2, and is produced by determining an intensity threshold, for example an intensity value between the peaks of an approximately bimodal intensity distribution, and assigning all pixels having intensities below the threshold a value of zero, and all other pixels a value of one. As shown by the "fuzzy" portions in the image of FIG. 6A, this thresholding operation may not identify all extraneous (white) pixels, and known image processing operations can improve the results displayed in image of FIG. 6A.

Figure 6B:
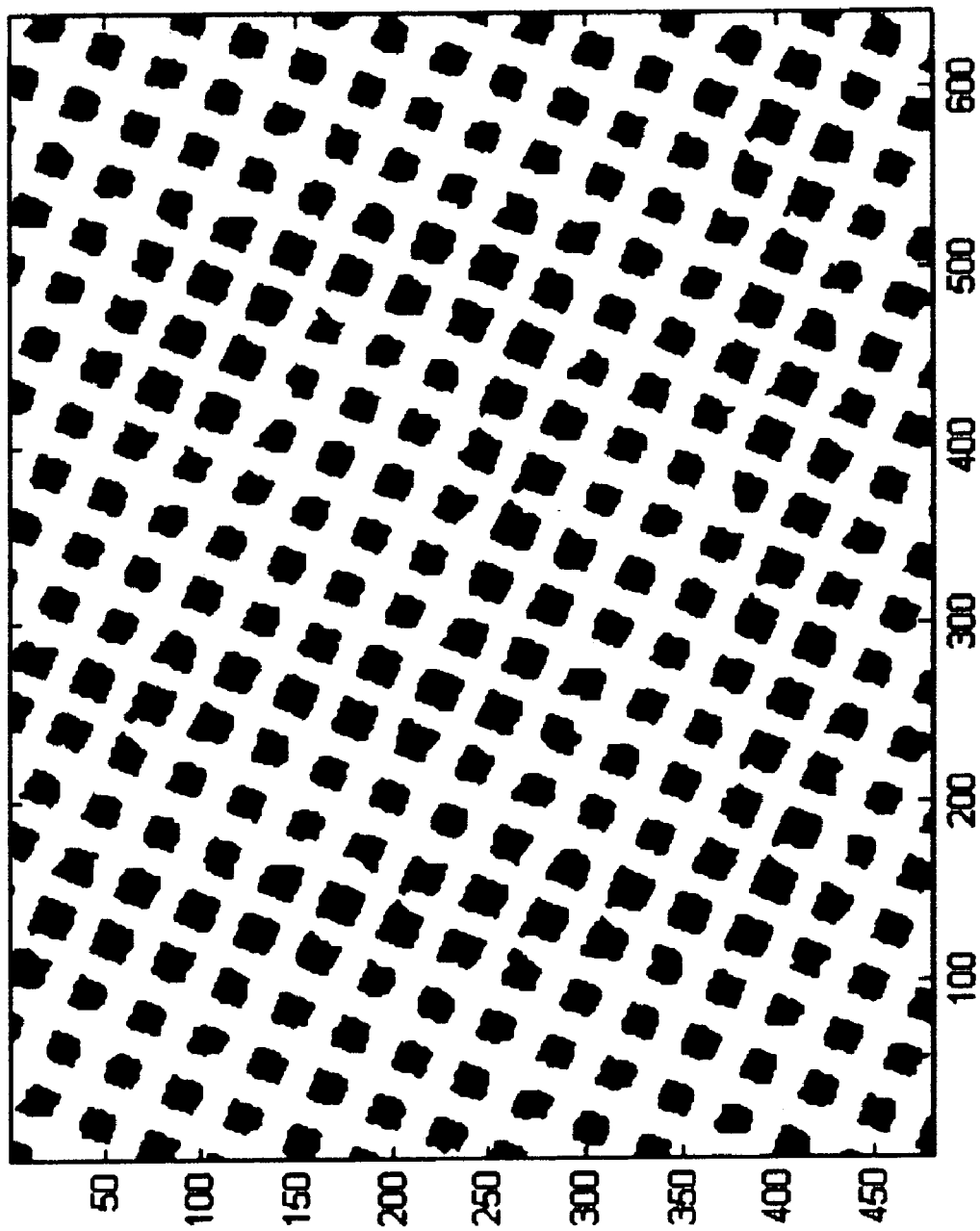

The pseudo-image of FIG. 6B shows the results from applying an erosion operation, followed by a first closing operation (a dilation followed by an erosion), followed by a dilation operation, followed by a second closing operation, followed by a final dilation operation. For example, the erosion operations may include assigning each pixel the value corresponding to the minimum pixel value (0, for a binary image) in its 8-cormected neighborhood. The dilation operations may include assigning each pixel the value corresponding to the maximum pixel value (1, for a binary image) in its 8-connected neighborhood. As can be seen in the image of FIG. 6B, the operations have conservatively identified the extraneous image data (the white grid) throughout the image, with few exceptions.

It should be appreciated that when the extraneous data is represented by a "1" in a binary image, performing one or more final dilation operations is one method of providing a "buffer region" at the edges of the extraneous data, in order to increase the likelihood that all pixels corresponding to the extraneous object are conservatively included. Such operations will also tend to add adjacent image pixels corresponding to shadows and/or other image artifacts, to the extraneous image data. It should be appreciated that one strength of various extraneous image data elimination methods according to this invention is that, even if some valid pixels are added to the extraneous image data to be eliminated, the remaining valid image pixels are not altered in any way. Thus, the only potential negative result from adding such a buffer region is that a limited number of valid pixels are eliminated. For most inspection images, this is not a significant problem. Thus, in various exemplary embodiments according to this invention, a buffer region a few pixels wide is added at all borders of a set of "best estimate" extraneous image data, in order to make it even more likely that the set of extraneous image data includes all extraneous image data. Various image processing operations outlined above, as well as various other image processing operations usable to identify extraneous feature data in various embodiments according to this invention, may be found in image processing literature, for example in *Machine Vision*, by Ramesh Jain, et al., McGraw Hill, 1995, which is incorporated herein by reference in its entirety.

Figure 7A:
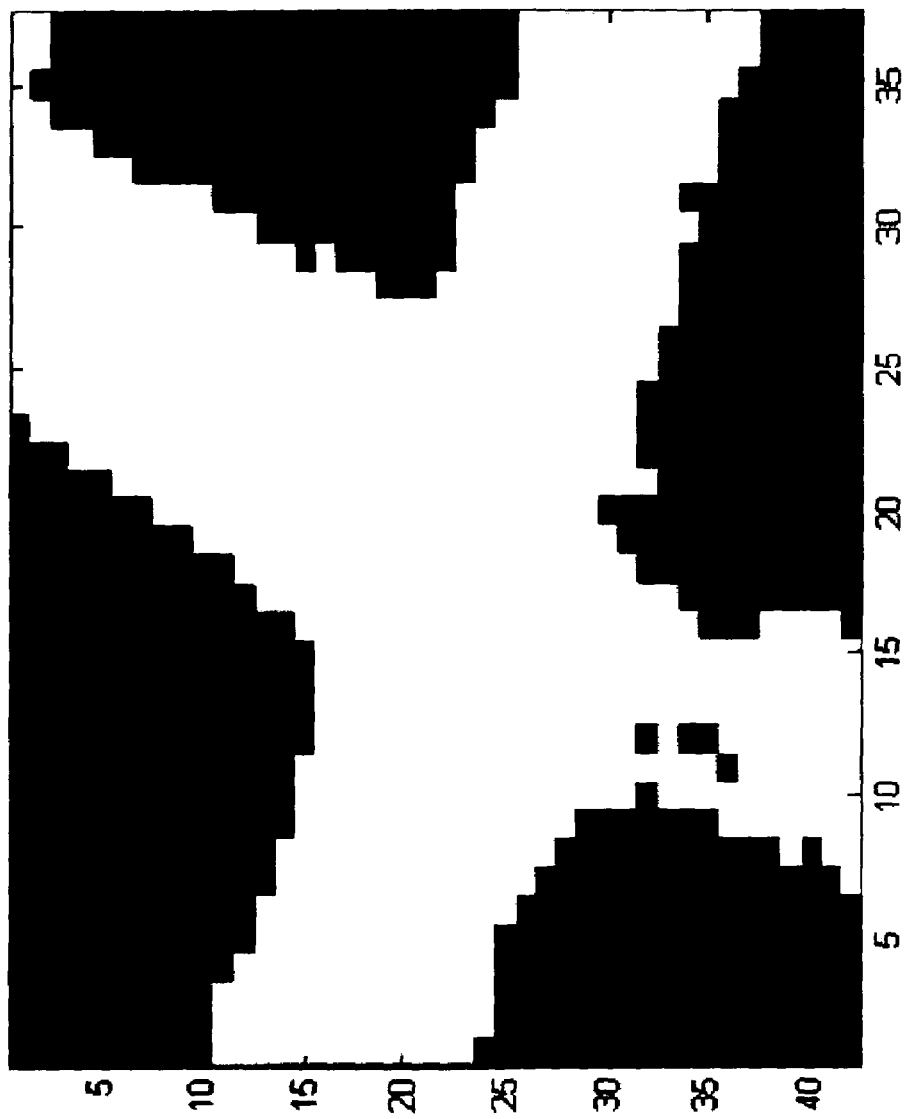
FIG. 7 shows intermediate pseudo-images that illustrate one embodiment of a second generic type of method that is usable for identifying pixels corresponding to certain types of extraneous features.
Figure 7C:
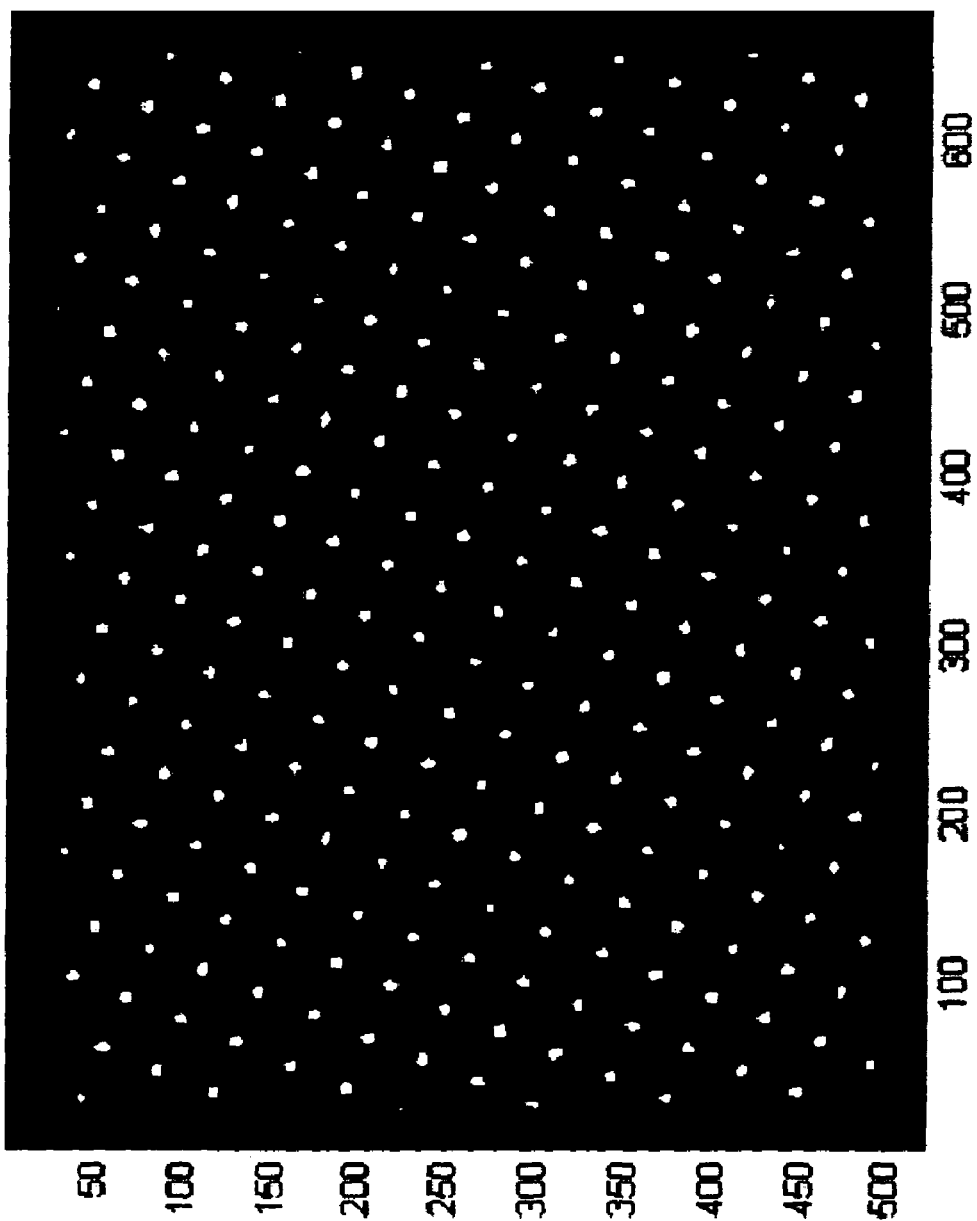

FIG. 7 shows intermediate images or pseudo-images that illustrate one embodiment of a second generic type of method that is usable for identifying and removing certain types of extraneous feature data in various embodiments and/or applications according to this invention, as demonstrated on the flat panel display screen image shown in FIG. 2. Briefly, the method used for the results shown in FIG. 7 analytically determines regions corresponding to extraneous pixels in an image, using a priori knowledge of the workpiece. For example, the a priori knowledge may be determined from a workpiece specification, or CAD file, and/or a preliminary image feature measurement, and/or a preliminary image feature characterization such as a template, or the like, of one or more characteristics of an extraneous feature of the workpiece.

The embodiment used to determine the results shown in FIG. 7 starts from the pseudo-image of FIG. 6A, described above. The pseudo-image template of FIG. 7A is an image portion comprising a selected instance of a repetitive feature found in the pseudo-image of FIG. 6A. Such an image portion may be defined by a machine operator during a training mode, for example. In this case, the template includes a representative intersection of the extraneous grid pattern 304.

The pseudo-image of FIG. 7B shows the results obtained by determining a normalized cross-correlation matrix based on the template of FIG. 7A and the pseudo-image of FIG. 6A. Higher intensity in the pseudo-image of FIG. 7B corresponds to better correlation. A normalized cross-correlation method, and usable alternative template matching methods, are described in "*A Survey Of Image Registration Techniques*" by L. G. Brown, *ACM Computing Surveys*, vol. 24, no. 4, pp. 325-376, 1992, which is incorporated herein by reference in its entirety. The location of the various intersections of the extraneous grid pattern 304 are clearly indicated by the intensity peaks in the pseudo-image of FIG. 7B.

Next, in various embodiments, the effective center or centroid of each of the peaks is determined by one of a variety of known methods. For example, a threshold can be applied to the pseudo-image of FIG. 7B, as previously described for the pseudo-image of FIG. 6A, and the centroids of the "islands" corresponding to the correlation peaks in the resulting binary image may be determined. Then, when the extraneous image feature comprises a grid of lines, a plurality of lines are fit to the grid of the centers or centroids. The line fitting may rely on a priori knowledge of the orientation and/or nominal space, or the like, of the grid lines. In various exemplary embodiments, the lines may be fit over a limited number of points in a local region of an image such as a region of interest for a defined inspection operation. In any case, it should be appreciated that in this exemplary embodiment, the lines will be located in a manner corresponding to any distortions that may be present in the grid in a particular image.

Figure 7D:
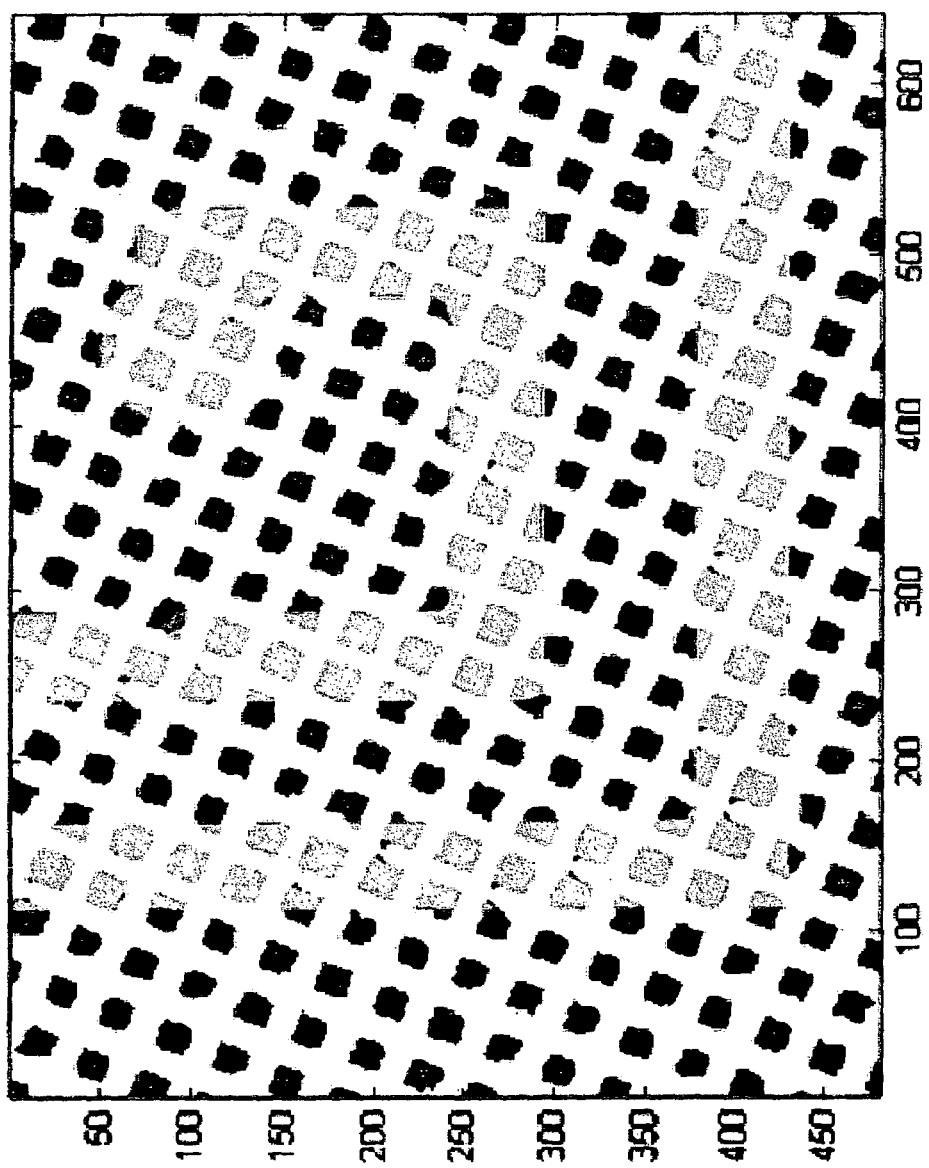

Next, the lines fit to the centers or centroids are given a width corresponding to a nominal line width on the extraneous feature, based on a priori knowledge, such as a specification or measurement of the nominal line width. In various embodiments, the lines having the nominal width are the extraneous image data to be excluding according to this invention. The image of FIG. 7D shows a representation of such analytically determined extraneous image data superimposed on a portion of the image shown in FIG. 2.

More generally, when the extraneous image feature comprises an identifiable nominal geometric feature that can be characterized based on a priori knowledge, such as a specification or measurement, that geometric feature can be nominally fit or located in an appropriate manner relative to one or more correlation peak locations determined in a manner analogous to the method outlined above. In various embodiments, such nominally fit or located nominal geometric features are the extraneous image data to be excluded according to this invention. Regardless of the shape(s) of the extraneous image data to be excluded, in various exemplary embodiments, a buffer region may be added to the extraneous image data, as previously described herein.

Regardless of which of the foregoing generic types of methods are used, the resulting extraneous pixels are identified and excluded from the inspection image data during certain inspection operations. For example, the original image data may be "masked" with the extraneous grid pattern. The term "mask" or "masking", when used in this context herein, is a verb that refers to certain image data operations. It is only coincidental that the workpiece shown in various images herein happens to be a "screen mask". It should be appreciated that the terms data and/or image masking, removal, exclusion, avoidance, etc., are all used non-specifically and approximately synonymously herein, to indicate that the extraneous image data and/or image portion(s) are marked, flagged, "address blocked", eliminated or otherwise made unavailable to certain image analysis operations according to this invention.

In various exemplary embodiments according to this invention, at least one embodiment of each of the foregoing first and second generic types of methods that are usable for identifying and removing certain types of extraneous feature data are included in the extraneous feature identification and display circuit, routine or application 160, shown in FIG. 4. In such embodiments, a GUI or other user interface of the machine vision inspection system 10 provides one or more features operable by a user in either a manual or a training mode of operation, to select and/or modify either of the first or second generic types of methods and/or their associated control parameters or control sub-operations, such as a threshold determining control parameter, template determining sub-operations, or the like.

As illustrated in FIG. 5, in various exemplary embodiments according to this invention, a defined set of extraneous image pixels can be indicated by a display area in which the extraneous image pixels or image data (e.g., the repetitive grid pattern 304, or the like) have been removed, such that the image portions identified as excluded data, and the appearance and content of the remaining valid image data, are readily apparent to a machine operator. Such a display is useful for observation and/or confirmation or approval of the results of the extraneous data removal operations, and for subsequent operator definition of feature inspection operations, as described further below. However, it should be appreciated that this display technique is one of convenience in certain embodiments according to this invention. According to this invention, the extraneous data need not be eliminated in the sense that it is destroyed, and it need not be explicitly and/or continuously marked or excluded in an actual image display, particularly during automatic operation of a machine vision system. The essential point is that the extraneous data is identified so that it may subsequently be excluded from, or made unavailable to, certain image analysis operations, by any now known or later-developed means under any operable program structure. However, it is convenient to show and discuss the results of such operations as conventional images or pseudo-images for purposes of explanation, and that convention is generally followed herein. It should be appreciated that such descriptions are not to be interpreted literally or in a limiting sense, unless this is specifically indicated by statement or by context.

Figure 8:
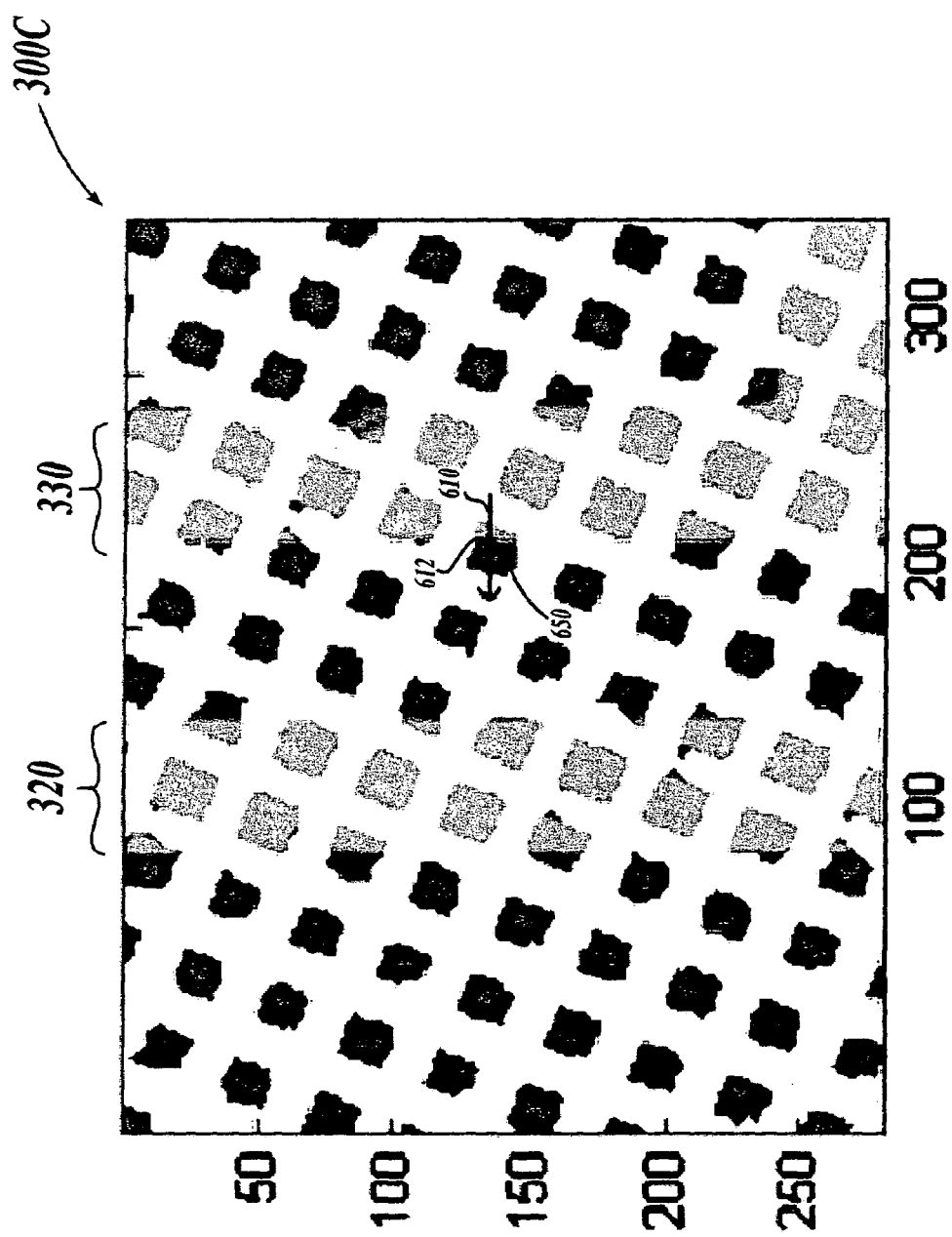
FIG. 8 is a diagram of an enlarged portion of the exemplary workpiece and feature of FIG. 5 further illustrating a line tool utilized at an edge portion of the feature.

FIG. 8 is a diagram of a display area 300C which shows an enlarged portion of the exemplary workpiece and feature of FIG. 5 and further illustrates a line tool utilized at an edge section of the feature. More specifically, a line tool 610 with a selector 612 is shown to be located over an edge portion 650, which is located at the left edge of the trace 330. In operation, the user places the selector 612 as close as possible to the edge of the trace 330. As will be described in more detail below with reference to FIG. 9, the line tool 610 then scans over data points (e.g., pixels) along its length.

Figure 9:
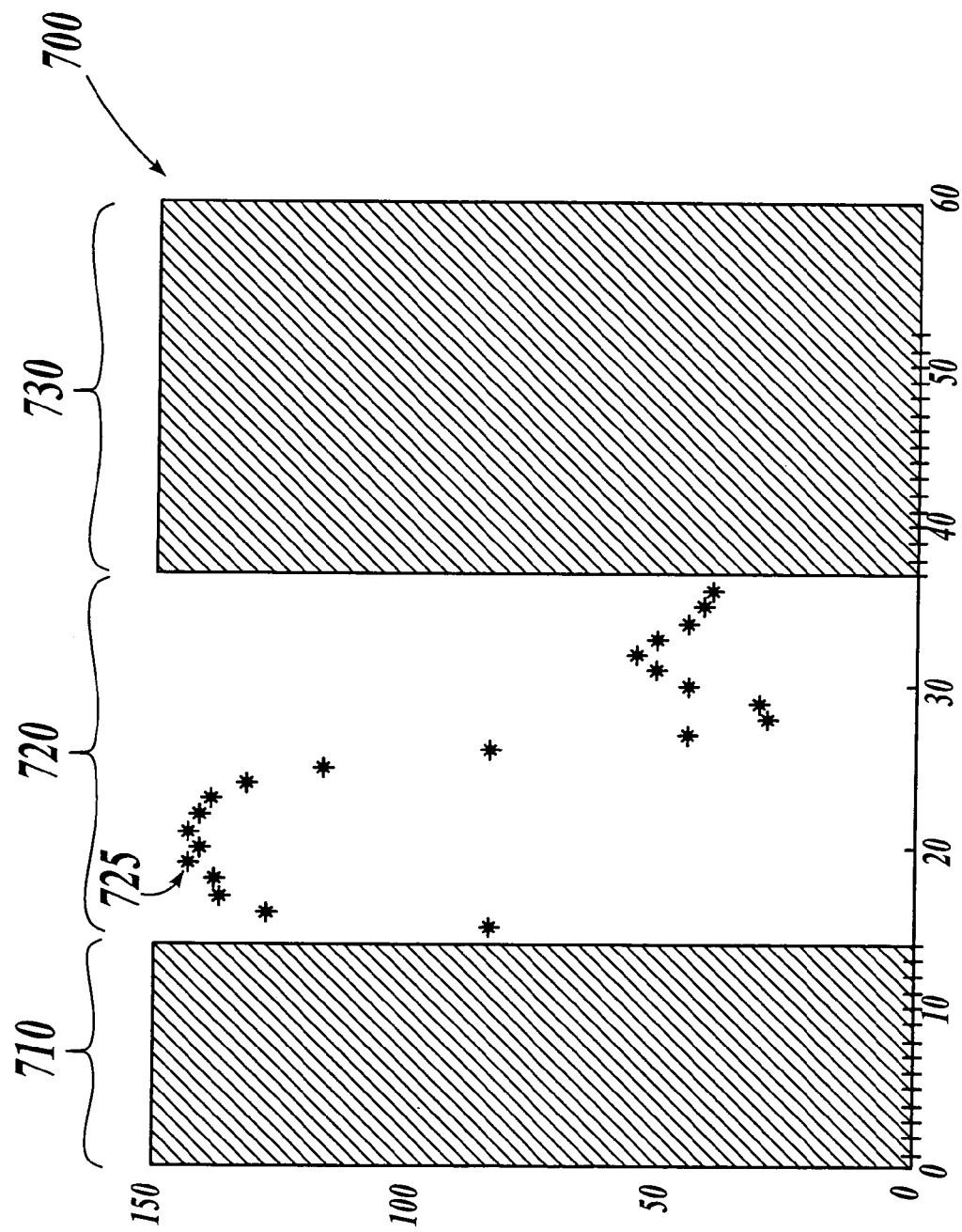
FIG. 9 is a diagram of image intensity values obtained across the line tool of FIG. 8.

FIG. 9 is a diagram of a graph 700 showing image intensity values 725 that have been obtained across the line tool 610 of FIG. 8. As shown in FIG. 9, the data points across the line tool are referenced from 0-60 along the horizontal axis, with the valid data region existing approximately between the region from 14-37 of the line tool. The invalid data region 710 (from the region 0-14) and the invalid data region 730 (from the region 37-60) correspond to the white background extraneous feature sections covered by the line tool 610. The valid data region 720 (from the region 14-37) illustrates the image intensity values that were obtained across the line tool 610 in that region. As shown beginning from data point 15, the image intensity values initially indicate a lighter region, which is then followed by a sharp drop-off in values which indicate a darker region. As will be discussed in more detail below, these image intensity values and the sharp drop-off can be utilized by image processing algorithms to determine the location of the edge of the trace 330.

For determining the location of the edge of the trace 330, the algorithms generally find the first edge as a desired characteristic. In one embodiment, the edge is determined by locating the maximum gradient within the intensity data. If there are multiple gradients along the line tool 610, then the location of the selector 612 can help the algorithm determine which gradient is the desired one. An indication (e.g., the orientation or direction of the tool 610) can also be provided for helping the algorithm determine whether it should be looking for a rising or a falling edge.

It should be noted that, as shown in FIG. 9, when performing the edge determining methods, in accordance with the present invention and as described above with respect to FIG. 5, the data that has been identified as extraneous has been removed and is thus completely disregarded by the tool 610. (As noted above, the invalid data regions 710 and 730 correspond to the white background sections where the grid pattern 304 has been removed.) Thus, in various embodiments, the invalid or extraneous image data is disregarded in a way that does not affect the normal operation of the imaging tools. Such tools typically already have significant algorithms built-in for considerations such as whether there are enough pixels for determining a valid gradient, etc., and for operator learning and ease of use, program reliability, program maintenance ease and the like, it is desirable for those algorithms to be able to operate in their normal manners. It is also desirable to have those operations continue to be reliable regardless of what technique is utilized for removing the extraneous image feature pixels. Thus, as described above, the operations illustrated by FIGS. 5-9 remove the extraneous data (the repetitive grid pattern 304) in such a way that the tool 610 will be able to operate in its normal manner.

Figure 10:
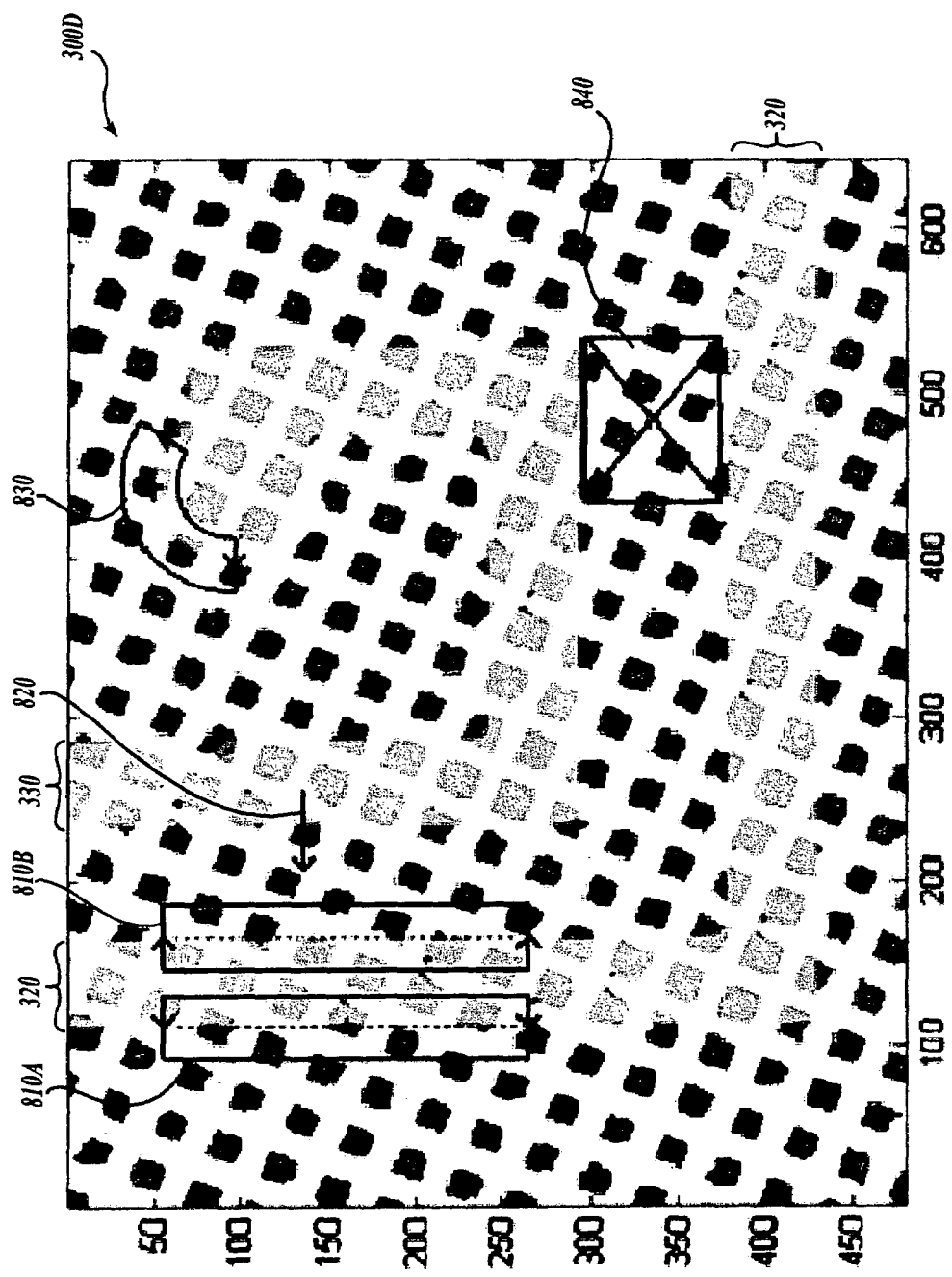
FIG. 10 is a diagram of the exemplary workpiece and feature of FIG. 5 illustrating exemplary embodiments of GUI widgets representing box, arc, and point tools for edge location and an auto focus tool.

FIG. 10 is a diagram of a display area 300D which shows the exemplary workpiece and feature to be inspected of FIG. 5, along with exemplary embodiments of GUI widgets representing box, arc and point tools for edge location, and an auto focus tool GUI widget, all usable in various embodiments of the systems and methods according to this invention. As shown in FIG. 10, the display area 300D includes box tool widgets 810A and 810B, a line tool widget 820, an arc tool widget 830 and a surface focus tool GUI widget 840. In various exemplary embodiments, these video tools 810-840 are used with predefined default settings. In various exemplary embodiments, these settings are adjusted or redefined by a user, but need not be redefined in order to use the tool. In various exemplary embodiments, the tools are employed with the alternative predefined selectable settings. Various operating characteristics of an edge focus tool GUI widget and a surface focus tool GUI widget are generally described in the QVPAK 3D CNC Vision Measuring Machine Users Guide and the QVPAK 3D CNC Vision Measuring Machine Operation Guide, which were previously incorporated herein by reference.

In various exemplary embodiments, the box tool widgets 810A and 8101B are displayed as boxes with arrows along the side and a selector in the center. In various exemplary embodiments, the box tool widgets 810A and 810B are sized, positioned and rotated by an operator, until the box is indicative of, or defines, the region of interest, and the arrow is indicative of an edge to be determined and inspected. In various exemplary embodiments, the box tool widgets 810A and 8101B use one or more conventional edge gradient(s) along the edge in the region of interest, and the edge is determined based on the location of the selector and the local magnitudes of the edge gradient(s) along various scan lines. The direction of the arrow defines a reference direction or polarity to be associated with the edge gradient in these various exemplary embodiments. It should be appreciated that the extents of the region of interest indicated by the boundaries of the box tool widgets 810A and 8101B are fully adjustable and rotatable, when desired.

The line tool widget 820 determines a gradient along a row of pixels (similar to the operation previously described for the line tool 610 of FIG. 8), while the arc tool widget 830 determines curves (e.g., a radius) for an edge of an image feature. Both the line tool widget 820 and the arc tool widget 830 include operations similar to those of the box tool widgets 810A and 810B, in that the edge of the image features is determined based on the location of the selector and the local magnitudes of the edge gradient(s) along various scan lines, as described above. As will be described in more detail below with reference to FIG. 12, the operation of the box tool widgets 810A and 810B and the arc tool widget 830 may consist of multiple uses of scan lines.

In various exemplary embodiments, the surface focus tool widget 840 is displayed as a box with an "X" in the center. In various exemplary embodiments, the surface focus tool widget 840 is sized, positioned and rotated by an operator, until the box is indicative of, or defines, the auto focus region of interest. It should be appreciated that the region of interest of the surface focus tool widget 840 is increased or reduced in size, to include approximately the proper surface portion used for a particular inspection operation, such as a height determination, or a surface finish evaluation, or the like, in various exemplary embodiments. In various exemplary embodiments, a surface focus operation provides an image focus that maximizes the definition or sharpness of a surface texture in a region of interest, or a pattern projected onto a smooth surface in a region of interest, in order to provide a coordinate value that precisely locates that surface along the Z-axis direction, or to provide an inspection image at the coordinate that provides the clearest image for inspecting the surface. In various exemplary embodiments, the surface focus metric used to determine the focus value for an auto focus image that is indicative of the degree of contrast in the region of interest.

Figure 11:
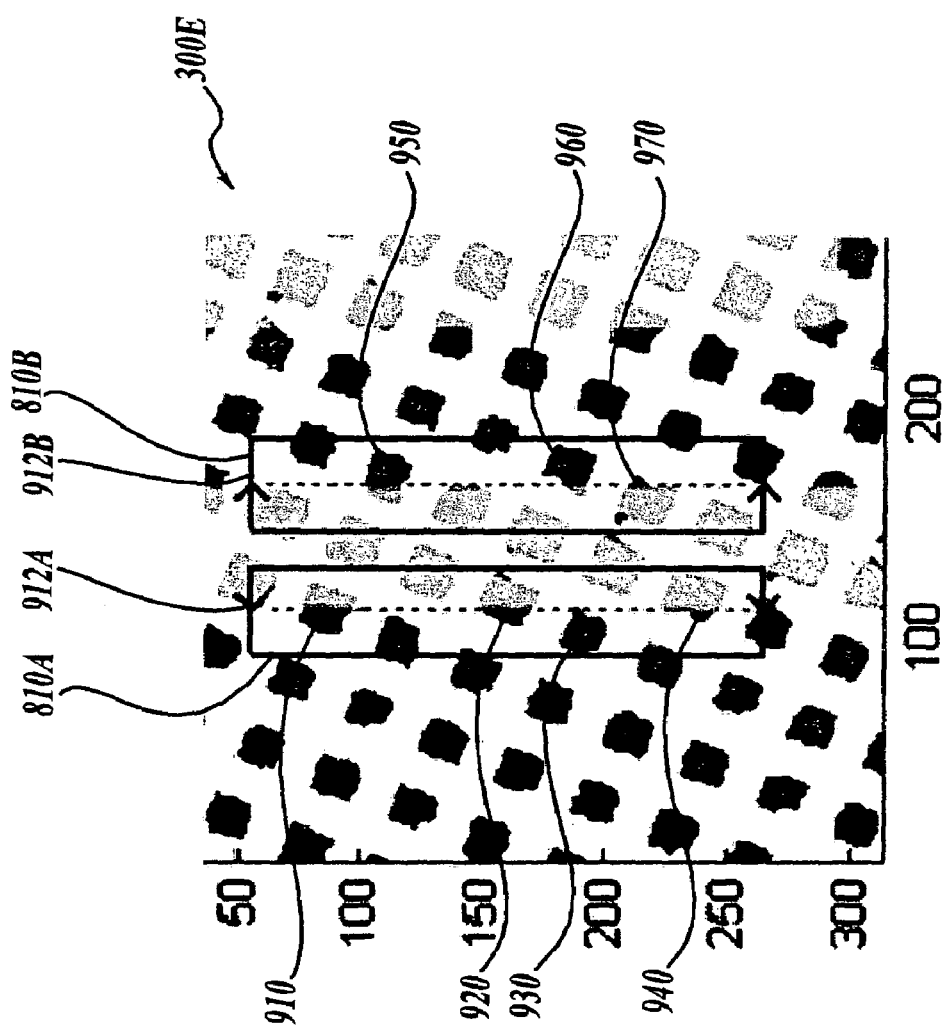
FIG. 11 is a diagram of an enlarged portion of the exemplary workpiece and feature of FIG. 10 including the box tools.

FIG. 11 is a diagram of a display area 300E which shows an enlarged portion of the display area of FIG. 10 further illustrating the box tool widgets 810A and 810B. As shown in FIG. 11, the box tool widgets 810A and 810B include central selector portions 912A and 912B, respectively, which operate similarly to the selector portion 612 of the line tool 610. As will be described in more detail below with respect to FIG. 12, the box tool widget 810A is shown to encompass edge portions 910, 920, 930 and 940, of the left edge of the trace 320, while the box tool widget 810B is shown to encompass edge portions 950, 960, and 970 of the right edge of the trace 320.

Figure 12:
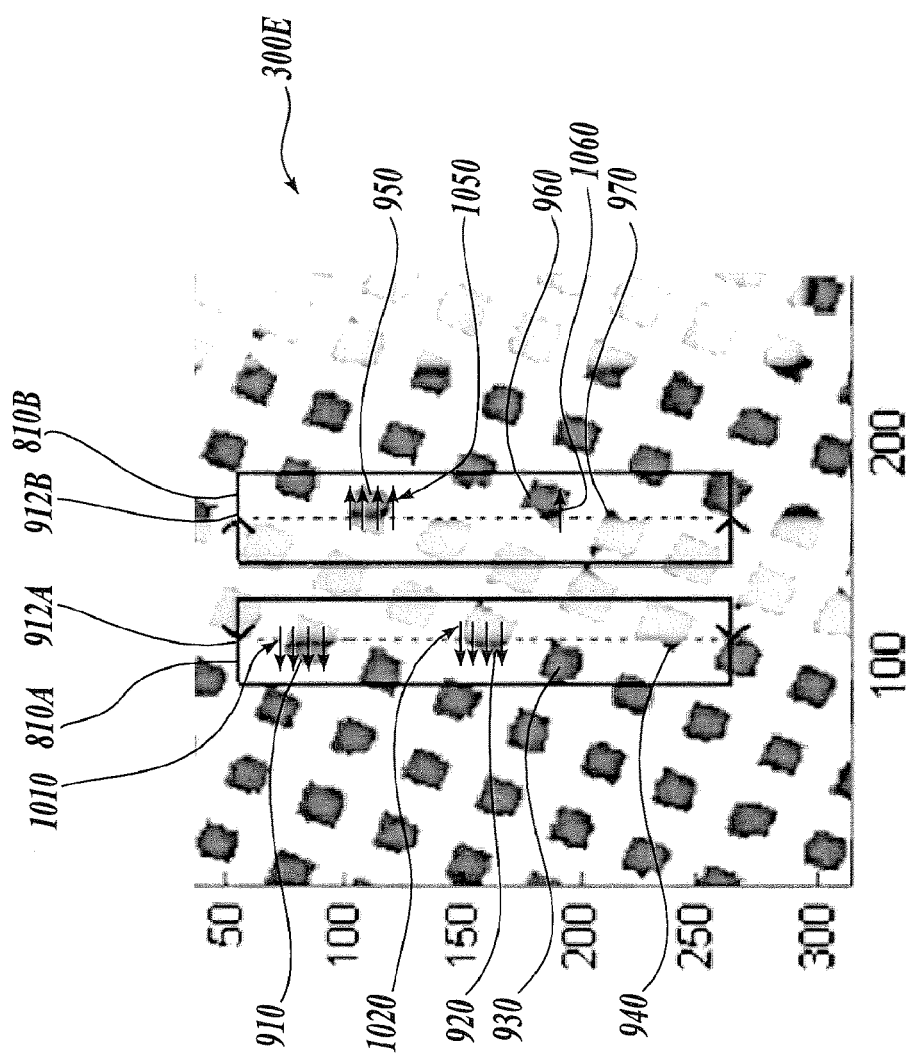
FIG. 12 is a diagram of the enlarged portion of FIG. 11 further illustrating the operation of the box tools.

FIG. 12 is a diagram of the display area 300E of FIG. 11, further illustrating the use of scan lines and the selection of valid data regions within the box tool widgets 810A and 810B. As shown in FIG. 12, the edge portion 910 is shown to now include four scan lines 1010, while the edge portion 920 now includes four scan lines 1020. These scan lines indicate areas where valid edge data may be found, according to criteria ordinarily included in the operations of such box tools. Various considerations for such scan lines may include the spacing, secondary scan line qualifications (e.g., the number of continuous pixels is a scan line), and other factors. In one embodiment, the spacing of the scan lines may be programmable either as a customizable default, or can be determined in each instance, in some cases utilizing a mechanism such as a user utilizing a sub-menu to alter the spacing.

In the display area 300E, because there are so few valid data regions, it is desirable to have the scan lines relatively closely spaced (e.g., every one or two rows of pixels). It should be noted that the edge portions 930 and 940 do not include scan lines. In one embodiment, scan lines are not provided for the edge portions 930 and 940 because they do not include enough contiguous valid data along potential scan lines according to the operation of the box tool 810A, and therefore, cannot contribute to the edge evaluation process. Similarly, within the box tool widget 810B, the edge portions 950 and 960 include scan lines, while the edge portion 970 has been excluded as not including enough contiguous valid data. As also illustrated within the box tool widget 8101B, the edge portion 960 includes only a single scan line 1060, which in one embodiment is indicative of the edge portion 960 having less valid data than the other edge portions with more scan lines, but enough valid data such that in contrast to the edge portion 970, it can contribute to the edge evaluation process.

In one embodiment, the box tool widgets 810A and 8101B are examples of the types of tools that may be utilized as part of the video tools 143 of FIG. 4. As described above, the region of interest generating component 150 may support automatic, semi-automatic, and/or manual operations that define various regions of interest that are operable in various video tools included in the video tool portion 143. With respect to the box tool widgets 810A and 810B, the region of interest generating component 150 may assist with the process of limiting or identifying the valid data that is passed to the further image processing functions of various video tools. In one embodiment, the region of interest generating component 150 may call the operations of the extraneous feature identification and display component 160. In another embodiment, the operations of the region of interest generating component 150 and the extraneous feature identification and display component 160 may be merged and/or indistinguishable. In either case, the activation of the operations of the extraneous feature identification and display component 160 may depend upon the activation of an extraneous feature exclusion mode by an operator of the machine vision inspection systems, as outlined further below. The region of interest generating component 150 can also have additional internal criteria for determining invalid data. For example, with respect to the scan lines, the region of interest generating component 150 may prescreen valid data scan lines and require enough valid data on both sides of the scan line in order to consider the data to be valid, otherwise it will be screened out in addition to the invalid data identified by the extraneous feature identifying operations (e.g., similar to the screening of the screened edge portions 930 and 940, previously described). In one embodiment, one of the functions of the region of interest generating component 150 is thus to include all of the valid data points and exclude all of the invalid ones. In another embodiment, these operations may also be included more in the image processing operations rather than in the region of interest generating component 150. As described above, the region of interest generating component 150 may also in one embodiment perform certain prescreening operations (e.g., may determine a nominal edge location and then determine if there are enough valid pixels to have that as a valid scan line location).

Figure 13:
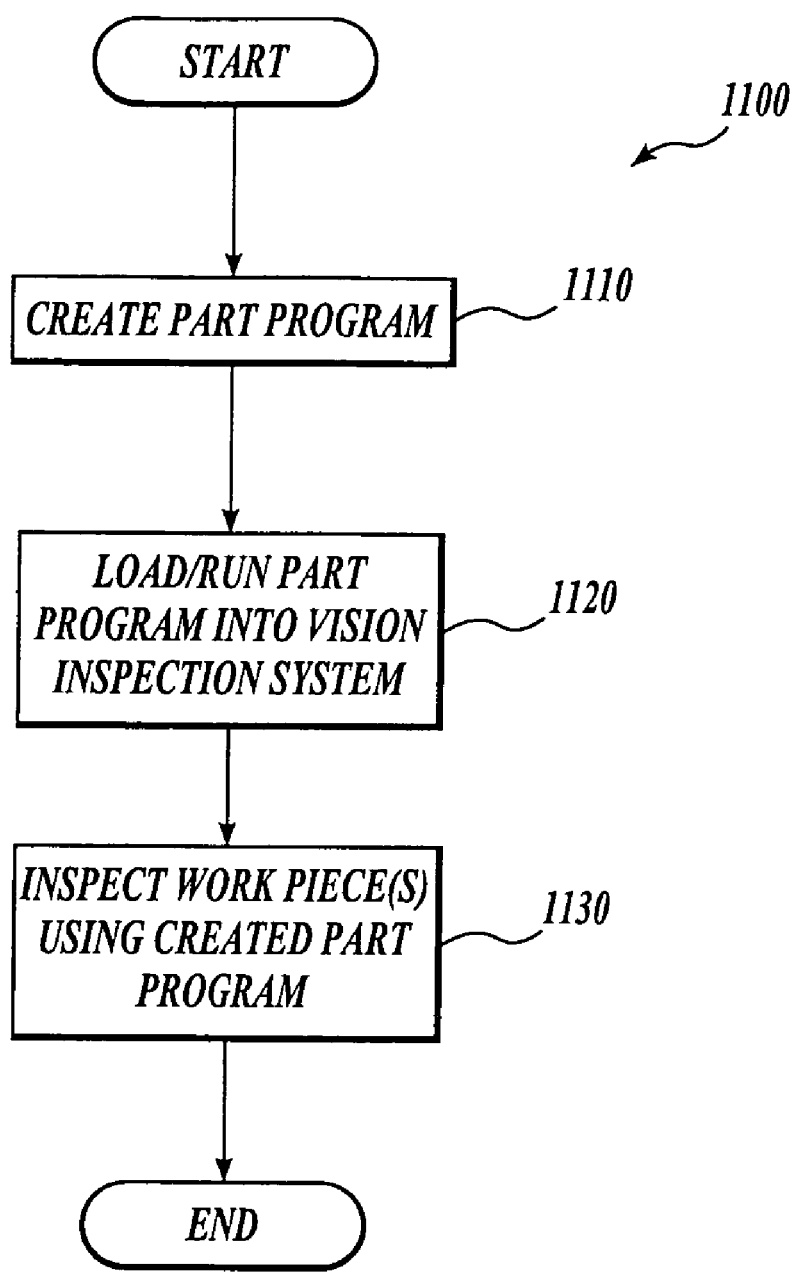
FIG. 13 is a flow diagram illustrative of one exemplary embodiment of a routine for programming and running a set of inspection operations for a general purpose precision machine vision system.

FIG. 13 is a flow diagram illustrating one exemplary embodiment of a routine 1100 for creating and using a part program to inspect a workpiece having an extraneous feature which is to be excluded from various image processing operations in a region of interest. At a block 1110, a part program is created which is usable to inspect the portion of the workpiece having the extraneous feature which is to be excluded from various image processing operations. At a block 1120, the created part program is run. At a block 1130, a number of workpieces having the extraneous feature which is to be excluded from various image processing operations are inspected using the part program.

Figure 14:
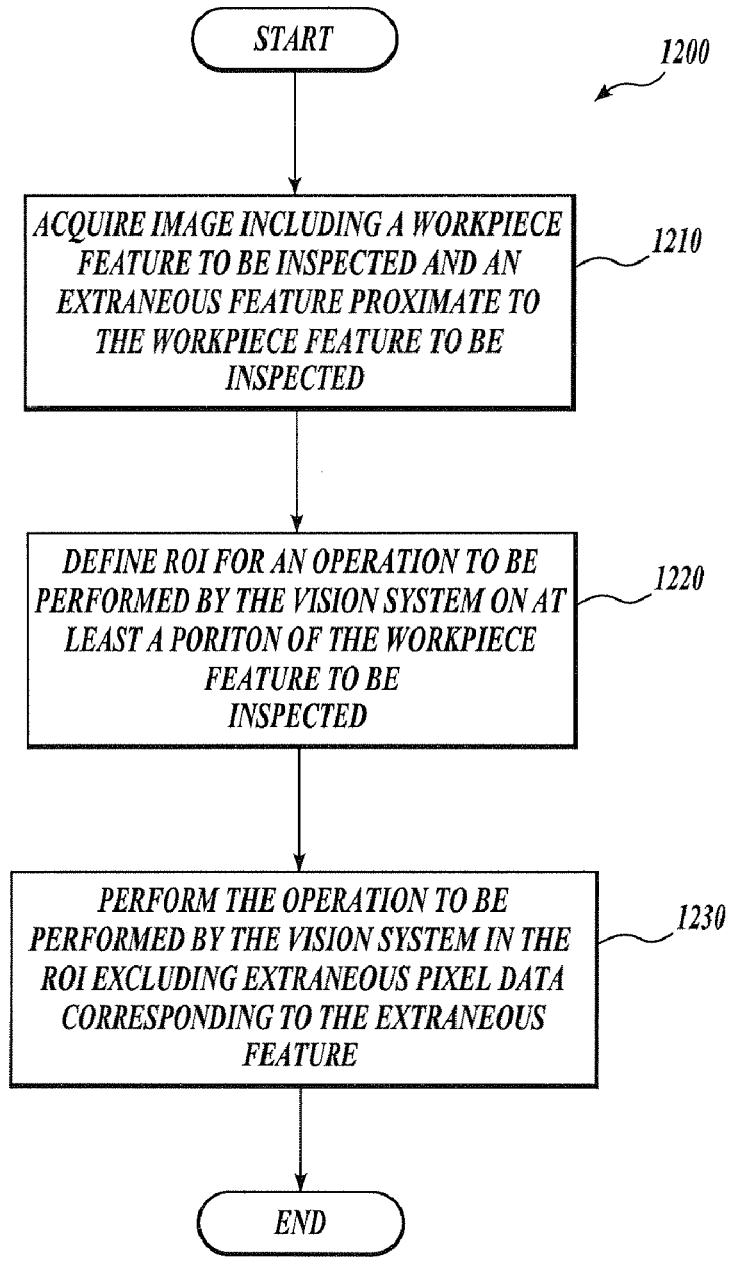
FIG. 14 is a flow diagram illustrative of one exemplary embodiment of a routine for excluding extraneous pixel data corresponding to an extraneous feature.

FIG. 14 is a flow diagram illustrative of one exemplary embodiment of a routine 1200 for excluding extraneous pixel data corresponding to an extraneous feature. At a block 1210, an image is acquired which includes both a workpiece feature to be inspected and an extraneous feature proximate to the workpiece feature. At a block 1220, the region of interest is defined for an operation that is to be performed by the vision system on at least a portion of the workpiece feature to be inspected. It should be appreciated that in various embodiments according to this invention, the region of interest may include both valid data regions and invalid data regions. Also in various exemplary embodiments, a user interface is utilized which can assist the user in defining a region of interest by providing box or other tools, as were described previously herein. It should be noted that in contrast to certain known systems where a user has previously been required to carefully position multiple point tools or the like, selectively, over the valid data regions as recognized by the user, the present system is easier to use. It should be appreciated that according to this invention, in various embodiments a general box tool, and/or other such efficient multi-point tools, can be generally positioned over a region which includes both valid and invalid data surrounding a desired feature to be inspected. Thus, the user is allowed to employ such more-efficient multi-point tools in their normal manner, without special consideration of the extraneous data which may be present. At a block 1230, the specified operation is performed by the vision system in the region of interest excluding the extraneous pixel data corresponding to the extraneous feature.

As will be discussed in more detail below, it will be appreciated that the routine 1200 of FIG. 14 is usable in both a training mode and in a run mode. It will also be appreciated that the routine 1200 does not require locating the extraneous features globally throughout the entire image, instead, only locating the extraneous features in the region of interest is sufficient in various embodiments and/or instances of operation. This is particularly useful when image distortion and/or actual workpiece distortion, is expected (for example, with extraneous fabric grids or the like) and an analytic definition of the extraneous object is being positioned on the image, in that when the only fit that is required is in the local region of interest, then there is a much greater chance of an accurate fit despite the general distortion of the overall image.

Figure 15:
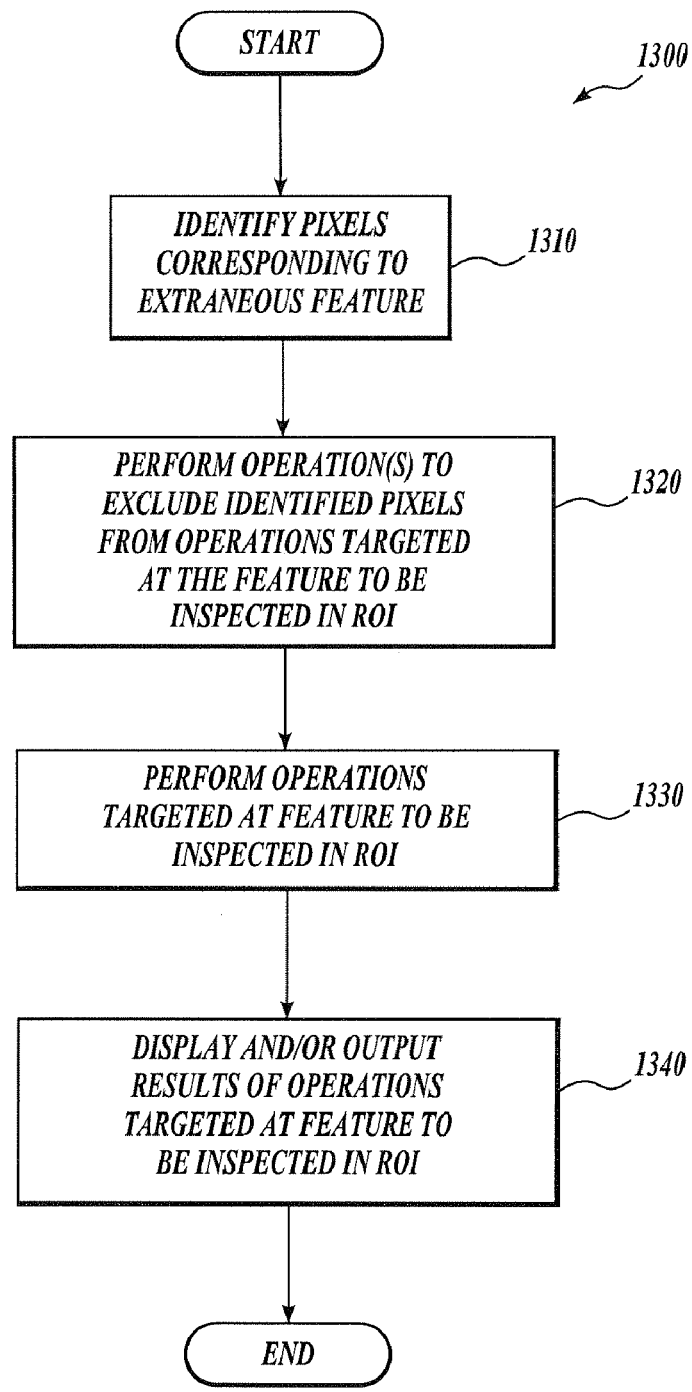
FIG. 15 is a flow diagram illustrative of one exemplary embodiment of a routine for providing results of operations targeted at a feature to be inspected in a region of interest.

FIG. 15 is a flow diagram illustrative of one exemplary embodiment of a routine 1300 for providing results of operations targeted at a feature to be inspected in a region of interest. In one embodiment, the routine 1300 may be usable at the block 1230 of FIG. 14. As shown in FIG. 15, at a block 1310, the pixels are identified that correspond to the extraneous feature. At a block 1320, the identified extraneous feature pixels are excluded such that they will not be included in the operations targeted at the feature to be inspected in the region of interest. It will be appreciated that the exclusion of the identified extraneous feature pixels may be performed at the region of interest processing operations, or at the imaging processing operations, or both. In other words, the pixels that correspond to the extraneous feature are first identified and are then excluded from future processing operations such that only the valid pixels corresponding to the desired feature to be inspected are included in the processing operations. The exclusion may be accomplished by any selected manipulation of the data (e.g., address exclusion, substitution, mathematical operations, screening by the imaging processing operations, etc.). At a block 1330, the operations are performed which are targeted at the remaining valid pixels which correspond to the feature to be inspected in the region of interest. Such operations may include objectives such as edge finding, surface focusing, edge focusing, arc measuring, etc. At a block 1340, the results of the operations are displayed and/or outputted.

Figure 16:
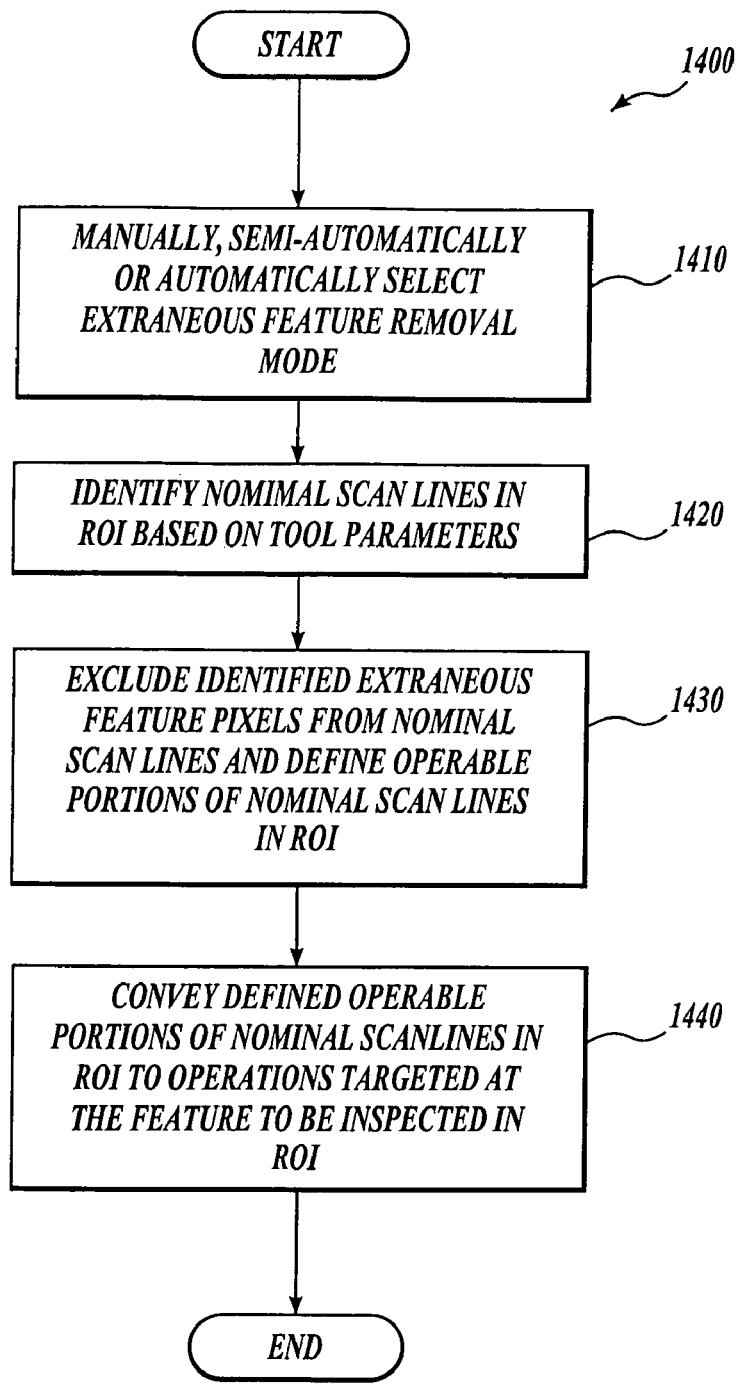
FIG. 16 is a flow diagram illustrative of one exemplary embodiment of a routine for providing defined operable portions of nominal scan lines in a region of interest to operations targeted at the feature to be inspected in the region of interest.

FIG. 16 is a flow diagram illustrative of one exemplary embodiment of a routine 1400 for providing defined operable portions of nominal scan lines in a region of interest to operations targeted at the feature to be inspected in the region of interest. In one embodiment, the routine 1400 is usable at block 1320 of FIG. 15. As shown in FIG. 16, at a block 1410, the extraneous feature removal mode is selected manually, semi-automatically, or automatically. At a block 1420, the nominal scan lines are identified in the region of interest based on the tool parameters. As discussed above, the tool parameters may relate to aspects such as the spacing of the scan lines, etc. At a block 1430, the identified extraneous feature pixels are excluded from the nominal scan lines and the operable portions of the nominal scan lines in the region of interest are defined. Thus, the operations that actually exclude the extraneous pixels are in this case performed in the region of interest type operations, in that the nominal scan lines are being refined to operable scan lines, and then only the operable portions of the nominal scan lines are passed to the next step. It will be appreciated that in other embodiments, the exclusion of the extraneous feature pixels may be implemented instead at the imaging process operations based on certain extraneous data identifiers, or flags, or values, or the like, or at a combination of the region of interest operations and the imaging processing operations. At a block 1440, the defined operable portions of the nominal scan lines in the region of interest are conveyed to the operations targeted at the feature to be inspected in the region of interest. As noted above, such operations may include objectives such as edge finding, surface focusing, edge focusing, arc measuring, etc. It will be appreciated that the routine 1400 is particularly advantageous in that it allows already created image processing tools to operate in their normal fashion, is relatively robust, and the main changes that will need to be made to existing systems are mostly in the region of interest generator. The region of interest generator is generally also the only component that is required to respond to the mode selection.

Figure 17:
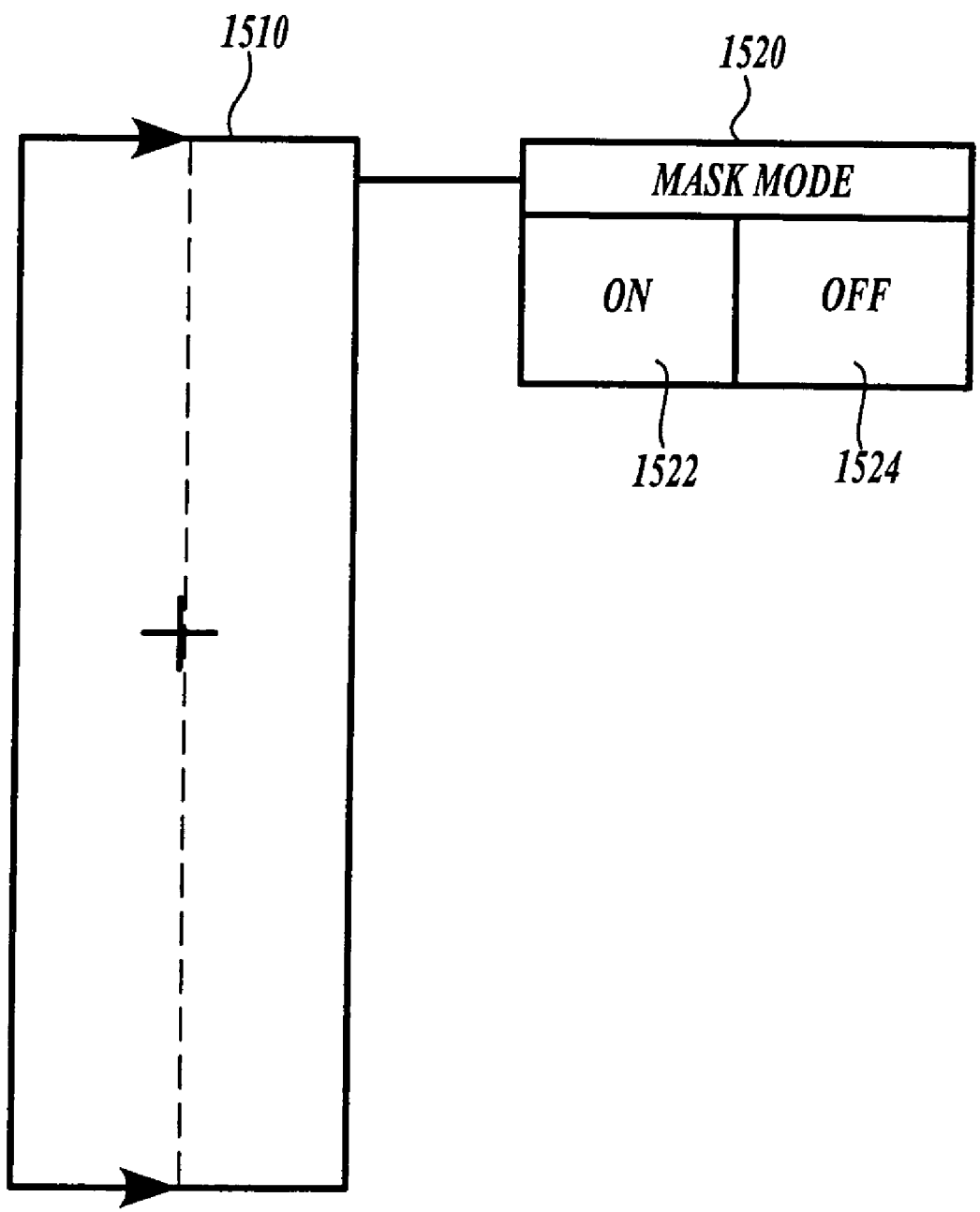
FIG. 17 is a diagram of an exemplary embodiment of a GUI box tool widget and a control widget usable to select a mask mode and operations associated with extraneous feature identification and exclusion operations.

FIG. 17 shows an exemplary embodiment of a box tool GUI widget 1510, along with an exemplary embodiment of a control widget 1520 usable to select a mask mode and operations associated with extraneous feature identification and exclusion operations according to this invention, in a training mode or manual mode of machine operation. In various exemplary embodiments, the control widget 1520 includes an on button 1522 and an off button 1524. When the on button 1522 is clicked on with a mouse or is otherwise actuated, it initiates automatic operations such that a region of interest can be analyzed to exclude extraneous feature pixels from various image processing operations associated with the box tool. Other tools may be provided with similar control widgets 1520. Of course the control widget 1520 can be represented in many other forms, divided, included within more complex multi-function widgets, or included directly within a video tool representation, or the like. The essential aspect of the widget 1520 is that it is usable to activate or deactivate an operating mode that is usable to identify and exclude extraneous image data from the various image processing or analysis operations according to this invention.

In various exemplary embodiments a demonstration mode related to the extraneous feature identifying operations may be provided. In such embodiments, a control widget 1520 may be clicked on with a mouse or otherwise actuated to initiate automatic operations that provide an extraneous feature identification learn or training mode demonstration that previews or mimics the results of comparable run mode operations, for example, as outlined previously. Such a demonstration may be evaluated by a machine operator to confirm or reject its efficacy and the associated programming parameters or instructions.

In various other exemplary embodiments, within a context of operation where the extraneous feature elimination mode is already currently or continuously in operation, a control widget 1520 may be clicked on with a mouse or otherwise actuated to accept the settings of a fully defined or trained extraneous feature identification operation, for example, or to bypass a training mode extraneous feature identification demonstration, or to accept the results indicated by an evaluation image provided as a result of a training mode extraneous feature identification demonstration, in order to move on to additional training mode operations. In other words, the operation of a control widget 1520 may depend on whether there is a higher level or background command in effect, that has already set the machine in an extraneous feature exclusion mode according to this invention. For example, such a mode may be appropriate when an extraneous feature covers most or all of an image including multiple features or regions to be inspected (e.g., the repetitive grid pattern 304, or the like). It should be appreciated that, in various exemplary embodiments, various aspects of the previously described extraneous feature identification tools and widgets may be implemented separately or in various combinations. Furthermore, it should be appreciated that, in various exemplary embodiments, alternative forms of the various GUI widgets and controls are apparent. Therefore, the foregoing embodiments are intended to be illustrative only, and not limiting.

Figure 18:
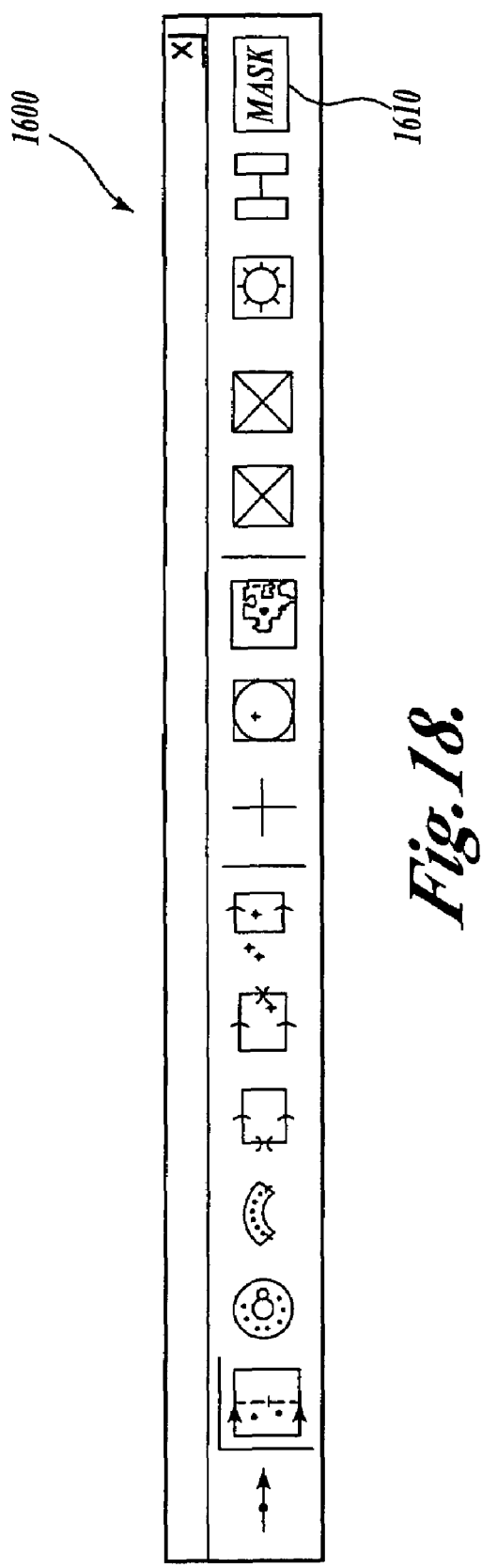
FIG. 18 is a diagram of an exemplary embodiment of a GUI toolbar window which includes an extraneous feature identification mode button or widget.

FIG. 18 illustrates one exemplary embodiment of a graphical user interface toolbar window 1600 which includes an extraneous feature identification mask mode selector 1610 usable according to this invention. The remainder of the toolbar window 1600 is similar to that provided in the QVPAK™ software discussed above. In one embodiment, the mask mode selector 1610 may be dragged onto an image for a global mask mode or onto an individual tool for a tool-specific mask mode. In one embodiment, the tools may have widgets that reflect when they are in a mask mode. In a second embodiment, the mask mode selector 1610 may remain on the toolbar 1600 and provides a toggling function. When the mask mode selector 1610 is toggled on, a video tool is dragged off of the tool bar 1600 and is in a mask mode, and may be provided with a visual feature that indicates that it is in the mask mode. In one embodiment, the user interface is be able to support a semi-automatic method of extraneous pixel identification, in which case when the mask mode is activated, the tool may query the user to select the semi-automatic technique, or displays an example of the results of several alternatives for the user to select from. In other words, in the learn mode, a user is able to click on the region of interest and position the cursor on the type of extraneous feature that the user wishes to remove, and then the system applies several different methods to attempt to remove the extraneous feature, and then displays the results of the several methods, such that the user is able to subjectively select the method that subjectively provides the best results, and then that method becomes the mode that is utilized. Various examples of how the user interface could support a semi-automatic method of extraneous pixel identification include the use of thresholding in combination with morphology, of the use of a texture tool in combination with a region growing supplement, an analytical pattern import in combination with an alignment, etc. In various exemplary embodiments, when a mask mode is activated or active and extraneous feature pixels are satisfactorily identified in a region of interest associated with a video tool, the machine vision inspection system includes program instructions that recognize this state, and the system automatically excludes the identified extraneous feature pixels from operations associated with the video tool in that region of interest.

Figure 19:
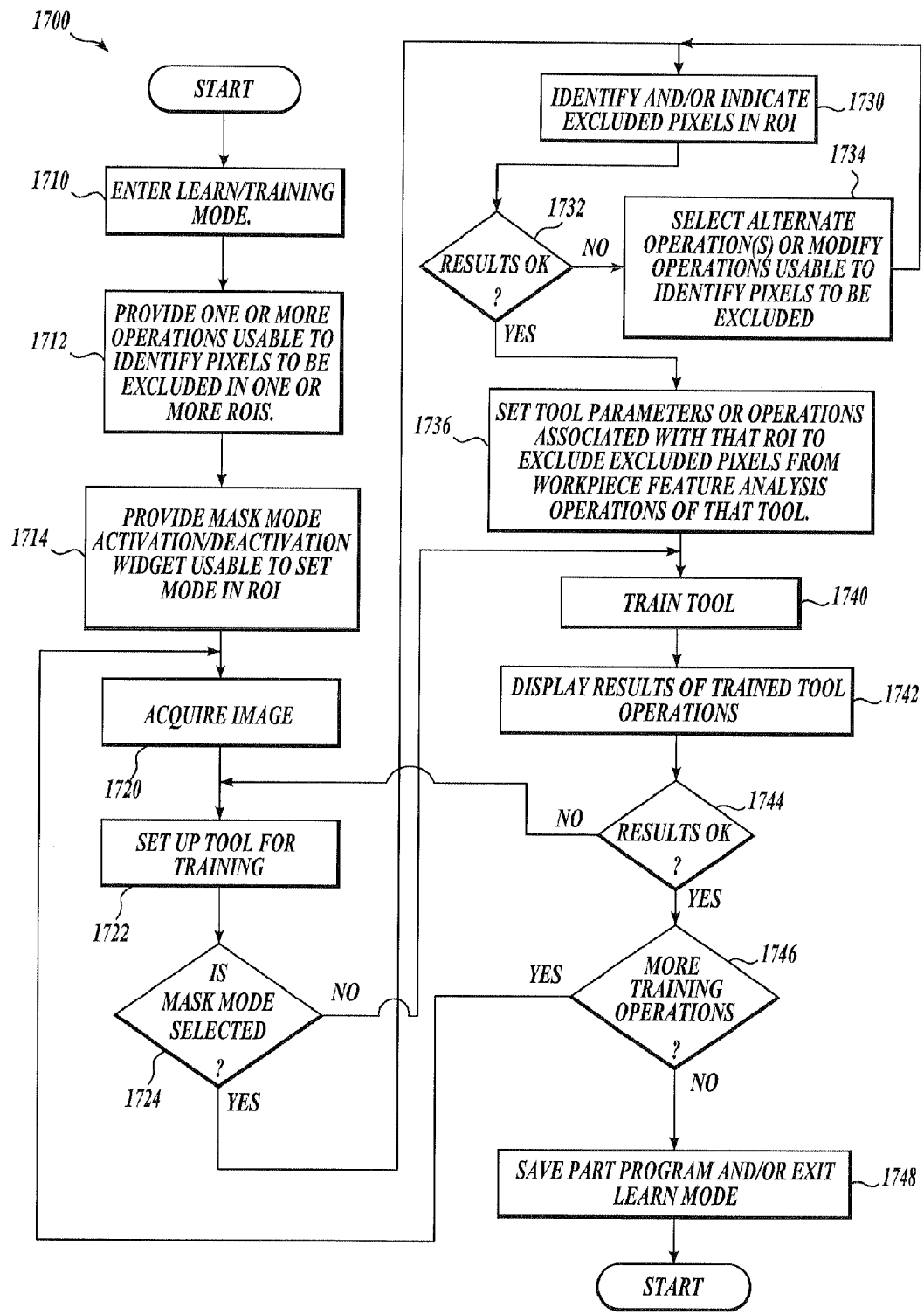
FIG. 19 is a flow diagram illustrative of one exemplary embodiment of a routine for executing a learn/training mode.

FIG. 19 is a flow diagram illustrative of one exemplary embodiment of a routine 1700 for performing learn mode operations with reference to a mask mode widget. At a block 1710, the learn/training mode is entered. At a block 1712, one or more operations are provided that are usable to identify pixels to be excluded in one or more regions of interest. At a block 1714, a mask mode activation/deactivation widget is provided that is usable to set the mode in the region of interest.

At a block 1720, the image is acquired. At a block 1722, the tool is set up for training. At a decision block 1724, a determination is made as to whether the mask mode has been selected. If the mask mode has not been selected, then the routine continues to a block 1740, as will be described in more detail below. If the mask mode has been selected, then the routine continues to a block 1730.

At block 1730, the excluded pixels in the region of interest are identified and/or indicated. At a decision block 1732, a determination is made as to whether the current results are acceptable. The determination may be made manually, semi-automatically, or automatically in various exemplary embodiments. If the current results are not acceptable, then the routine continues to a block 1734, where alternate operations are selected or operations usable to identify pixels to be excluded are modified, after which the routine returns to block 1730. If at decision block 1732 the results are indicated to be acceptable, then the routine continues to a block 1736, where the routine sets the tool parameters or operations associated with that region of interest to exclude excluded pixels from the workpiece feature analysis operations of that tool.

At block 1740, the tool is trained. At a block 1742, the results of the trained tool operations are displayed. At a decision block 1744, a determination is made as to whether the current results of the trained tool are acceptable (e.g.— was the expected edge found, is its location approximately as expected, etc.). If the current results are not acceptable, then the routine returns to block 1722. If the current results are acceptable, then the routine continues to a decision block 1746.

At decision block 1746, a determination is made as to whether more training operations will be performed. If additional training operations are to be performed, then the routine returns to block 1720. If additional training operations are not to be performed, then the routine continues to a block 1748, where the part program is saved and/or the learn mode is exited.

It will be appreciated that the routine 1700 provides for simple operation by a user, in that standardized types of video tools may be utilized, rather than requiring customized operations. In other words, a user is not required to utilize scripting languages for implementing customized operations. Instead, the system allows for the use of pre-programmed icons and the like that even an unskilled user is able to use with minimal training. Furthermore, as noted above, the region of interest is able to encompass both valid and invalid data. Thus, the user is not required to place individual point tools over all of the valid data regions.

It should be appreciated that certain existing machine vision inspection systems can employ various embodiments of the systems and methods according to this invention with minimal or no "retrofit" modifications to such existing machines, and the extraneous feature identification capability, robustness and versatility of such machines may still be increased according to the principles of this invention. In various exemplary embodiments, only the addition of machine vision inspection software methods and/or modifications according to the principles of this invention are included in the retrofit modifications.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications, variations, improvements, and/or substantial equivalents.

The embodiments of the invention in which an exclusive property or privilege is claimed are defined as follows:

1. A method for inspecting a camera image of a workpiece acquired by a machine vision inspection system, the machine vision inspection system having a camera that provides the camera image and a user interface usable to define a sequence of operations usable to inspect the camera image, the method comprising:
    acquiring a camera image including an extraneous feature having an extraneous edge located proximate to an edge feature to be inspected;
    defining a region of interest in the camera image, the region of interest associated with an edge location video tool provided by the user interface, the edge location video tool having one or more associated edge locating operations;
    identifying extraneous feature pixels corresponding to the extraneous feature at least in the region of interest; and
    performing the one or more edge locating operations associated with the video tool to locate the edge feature to be inspected, the edge locating operations including analyzing camera image data in the region of interest, wherein:
    the identified extraneous feature pixels are excluded from camera image data analyzed by the edge locating operations associated with the video tool, and
    the camera image data analyzed by the edge locating operations associated with the video tool are not modified before being analyzed by the edge locating operations associated with the video tool.

2. The method of claim 1, wherein the extraneous feature comprises a first normal workpiece feature that occurs as a foreground object in the camera image such that it occludes a second normal workpiece feature that occurs as a background object in the camera image, the second normal workpiece feature including the edge feature to be inspected.

3. The method of claim 2, wherein the extraneous feature comprises at least one of a) a grid-like feature, and b) a grid-like feature of a flat panel display screen mask.

4. The method of claim 1, wherein identifying extraneous feature pixels at least in the region of interest comprises:
   identifying a first set of pixels estimated to correspond to the extraneous feature;
   determining a second set of pixels that comprise a buffer region adjacent to at least some of the pixels of the first set; and
   including pixels corresponding to the first and second sets in the identified extraneous feature pixels.

5. The method of claim 4, wherein determining the second set of pixels comprises performing at least one dilation operation on the first set of pixels.

6. The method of claim 1, wherein the extraneous feature pixels are identified only in the region of interest.

7. The method of claim 1, wherein the user interface includes at least one extraneous feature mode widget that is usable for at least one of a) initiating a mode of operation of the machine vision inspection system wherein operations usable to identify extraneous feature pixels are activated, and b) indicating at least an "on" status of a mode of operation of the machine vision inspection system wherein operations usable to identify extraneous feature pixels are activated.

8. The method of claim 7, wherein the user interface includes at least one extraneous feature mode widget that is usable to deactivate the mode of operation of the machine vision inspection system wherein the operations usable to identify extraneous feature pixels are active.

9. The method of claim 7, wherein defining a region of interest comprises defining the region of interest using a graphical region of interest indicating widget of the video tool, and the at least one extraneous feature mode widget is associated with the video tool and comprises at least one of a) a mode status indicating widget and b) a mode control widget.

10. The method of claim 1, wherein identifying extraneous feature pixels at least in the region of interest comprises using thresholding techniques to identify regions corresponding to extraneous feature pixels and morphology techniques to filter anomalous portions of the boundaries of the identified regions.

11. The method of claim 1, wherein identifying extraneous feature pixels at least in the region of interest comprises:
   determining a template of at least a portion of the extraneous feature;
   performing correlation operations based on the template and an inspection image, and identifying at least one correlation peak location that corresponds to a feature in the inspection image that at least approximately matches the template;
   characterizing a nominal geometric feature corresponding to at least one portion of the extraneous feature based on a priori knowledge of the workpiece;
   locating the nominal geometric feature relative to the at least one correlation peak location; and
   identifying pixels corresponding to the located nominal geometric feature as extraneous feature pixels.

12. The method of claim 1, wherein the machine vision inspection system includes a mode of operation wherein operations usable to identify extraneous feature pixels are activated, and the user interface comprises at least one control widget usable to activate the mode of operation.

13. The method of claim 12, wherein the machine vision inspection system includes predetermined extraneous feature pixel identification operations, and the user interface includes features usable by an operator to determine at least one of S1) at least one subset of the predetermined extraneous feature pixel identification operations to be applied to an image, and S2) at least one parameter that governs a predetermined extraneous feature pixel identification operation to be applied to an image, and identifying extraneous feature pixels at least in the region of interest comprises an operator selecting at least one of S1) and S2).

14. The method of claim 13, wherein identifying extraneous feature pixels at least in the region of interest comprises:
   identifying a set of extraneous feature pixels according to the operator selection of at least one of S1) and S2);
   providing a display of the identified set of extraneous feature pixels superimposed at their proper locations on at least a portion of the original inspection image such that they are easily distinguished; and
   the operator approving the identified set of extraneous feature pixels based on the display,
   wherein the operator approval takes place prior to performing the one or more operations associated with the video tool.

15. The method of claim 14, wherein the method is performed during a training mode of operation of the machine vision inspection system and when the operator approval takes place prior to performing the one or more operations associated with the video tool, machine control instructions corresponding to the operator selection of at least one of S1) and S2) are in a part program for automatically inspecting the workpiece.

16. The method of claim 1, wherein a first set of operations used for identifying extraneous feature pixels at least in the region of interest are performed prior to beginning a second set of operations used for performing the one or more operations associated with the video tool.

17. A machine vision inspection system usable for acquiring and inspecting a camera image of a workpiece, wherein the camera image includes an extraneous feature having an extraneous edge located proximate to an edge feature to be inspected, the machine vision inspection system comprising:
   a user interface usable to define a set of operations usable to inspect the camera image of the workpiece that includes the extraneous feature and the edge feature to be inspected, the user interface including an edge location video tool;
   an image acquisition portion comprising a camera usable for acquiring the camera image of the workpiece image that includes the extraneous feature and the edge feature to be inspected;
   a region of interest defining portion usable to define a respective region of interest in the camera image, the respective region of interest corresponding to the edge location video tool provided by the user interface, the edge location video tool having one or more associated edge locating operations, the edge locating operations including analyzing camera image data in the region of interest; and
   an extraneous feature identifying portion usable to identify extraneous feature pixels corresponding to the extraneous feature at least in the respective region of interest,
   wherein, when the extraneous feature identifying portion is used to identify extraneous feature pixels at least in the respective region of interest of the camera image, the machine vision inspection system operates to exclude the identified extraneous feature pixels from the camera image data analyzed by the edge locating operations associated with the video tool, and the camera image data analyzed by the edge locating operations associated with the video tool are not modified before being analyzed by the edge locating operations associated with the video tool.

18. The machine vision inspection system of claim 17, wherein when the extraneous feature identifying portion is used to identify extraneous feature pixels corresponding to the extraneous feature the machine vision inspection system automatically excludes the identified extraneous feature pixels from the camera image data analyzed by the edge locating operations associated with the video tool.

19. The machine vision inspection system of claim 17, wherein the user interface includes at least one feature that is usable for at least one of a) initiating a mode of operation of the machine vision inspection system wherein operations usable to identify extraneous feature pixels are activated, and b) indicating at least an "on" status of a mode of operation of the machine vision inspection system wherein operations usable to identify extraneous feature pixels are activated.

20. The machine vision inspection system of claim 19, wherein the region of interest defining portion is usable to define the respective region of interest based on a graphical operator-configurable region of interest indicating widget corresponding to the respective video tool, and the at least one feature that is usable for at least one of a) and b) comprises at least one of a mode status indicating widget associated with the respective video tool and a mode control widget associated with the respective video tool.

21. The machine vision inspection system of claim 17, wherein the extraneous feature identifying portion comprises predetermined extraneous feature pixel identification operations, and the user interface includes features usable by an operator to determine at least one of S1) at least one subset of the predetermined extraneous feature pixel identification operations, to be applied to the camera image of the workpiece, and S2) at least one parameter that governs a predetermined extraneous feature pixel identification operation to be applied to the camera image of the workpiece, and the extraneous feature identifying portion identifies extraneous feature pixels based on the operator determination of at least one of S1) and S2).

* * * * *

UNITED STATES PATENT AND TRADEMARK OFFICE
CERTIFICATE OF CORRECTION

PATENT NO.        : 7,324,682 B2                                    Page 1 of 1
APPLICATION NO.   : 10/808948
DATED             : January 29, 2008
INVENTOR(S)       : R. M. Wasserman It is certified that error appears in the above-identified patent and that said Letters Patent is hereby corrected as shown below:

| COLUMN | LINE | ERROR |
|---|---|---|
| 27 (Claim 18,) | 10 | after "extraneous feature" insert --,-- |

Signed and Sealed this

Fourteenth Day of April, 2009

JOHN DOLL
*Acting Director of the United States Patent and Trademark Office*